United States Patent [19]

Rao et al.

[11] Patent Number: 5,522,022
[45] Date of Patent: May 28, 1996

[54] ANALYZING AN IMAGE SHOWING A NODE-LINK STRUCTURE

[75] Inventors: Satyajit Rao, Bangalore, Ind.; James V. Mahoney, San Francisco, Calif.

[73] Assignee: Xerox Corporation, Stamford, Conn.

[21] Appl. No.: 157,600

[22] Filed: Nov. 24, 1993

[51] Int. Cl.$^6$ .................................................. G06T 5/00
[52] U.S. Cl. ............................................ 395/140; 395/133
[58] Field of Search ................................. 395/120, 124, 395/125–127, 129–132, 133, 140, 152, 155, 161, 700, 128; 382/254, 266

[56] References Cited

U.S. PATENT DOCUMENTS

| | | | |
|---|---|---|---|
| 5,148,522 | 9/1992 | Okazaki | 395/161 |
| 5,237,691 | 8/1993 | Robinson et al. | 395/700 |
| 5,251,290 | 10/1993 | Pabon | 395/120 |
| 5,297,057 | 3/1994 | Kramer et al. | 395/152 |

OTHER PUBLICATIONS

Bunke, H., "Attributed Programmed Graph Grammars and Their Application to Schematic Diagram Interpretation," *IEEE Transactions on Pattern Analysis and Machine Intelligence*, vol. PAMI–4, No. 6, Nov. 1982, pp. 5674–582.

Ricoh Imagio MF530 Series General Catalog, Ricoh K. K., 1992, with English translation of cover page and pp. 1–2 and 23–24.

The Apple Catalog, Fall 1993, pp. 1 and 4–5.

Borgefors, G., "Distance Transformations in Digital Images," *Computer Vision, Graphics, and Image Processing*, vol. 34, 1986, pp. 344–371.

Helm, R. Marriott, K., Odersky, M., "Building Visual Language Parsers," in Proceedings of CHI, 1991 (New Orleans, Louisiana, Apr. 29–May 2, 1991), ACM, New York, 1991, pp. 105–112.

Lin, X., Shimotsuji, S., Minoh, M., and Sakai, T., "Efficient Diagram Understanding with Characteristic Pattern Detection," *Computer Vision, Graphics, and Image Processing*, vol. 30, 1985, pp. 84–106.

Tsunekawa, S., and Shimotsuji, S., "Automatic Drawing Reader—TOSGRAPH," *Systems and Computers in Japan*, vol. 17, No. 4, 1986, pp. 1–8.

Suenaga, Y., "A Facsimile Based Text Editor Using Handwritten Mark Recognition," IJCAI–79, Proceedings of the Sixth International Joint Conference on Artificial Intelligence, Tokyo, Aug. 20–23, 1979, vol. 2, pp. 856–858.

Suenaga, Y., and Nagura, M., "A Facsimile Based Manuscript Layout and Editing System by Auxiliary Mark Recognition," 5th International Conference on Pattern Recognition, vol. 2, IEEE, 1980, pp. 856–858.

*Primary Examiner*—Almis R. Jankus

[57] ABSTRACT

Input image data define an input image set that shows a node-link structure, such as a directed graph, an undirected graph, a tree, a flow chart, a circuit diagram, or a state-transition diagram. The input image set can include one image showing the node-link structure or two images, one showing graphical features that are a subset of the nodes and the other an image of an overlay with editing marks that include the links and another subset of the nodes. The input image data are used to obtain likely node-link data indicating parts of the input image set that satisfy a constraint on nodes and parts that satisfy a constraint on links. The likely node-link data are used to obtain constrained node-link data indicating subsets of the likely nodes and links that satisfy a constraint on node-link structures. The likely node-link data can include data defining a likely node image showing parts that meet a node criterion and data defining a likely link image showing parts that meet a link criterion. The constrained node-link data can be obtained by iteratively applying a link nearness criterion to the likely nodes and a node nearness criterion to the likely links until stability is reached. The constrained node-link data can be used to obtain output image data defining an output image that includes a precisely formed version of the node-link structure or an edited version of an input image. Or the constrained node-link data can be used to provide control signals to a system.

30 Claims, 17 Drawing Sheets

ANALYZING AN IMAGE SHOWING A NODE-LINK STRUCTURE

BACKGROUND OF THE INVENTION

The present invention relates to techniques for analyzing an image showing a graphical representation.

Bunke, H., "Attributed Programmed Graph Grammars and Their Application to Schematic Diagram Interpretation," *IEEE Transactions on Pattern Analysis and Machine Intelligence*, Vol. PAMI-4, No. 6, November 1982, pp. 574–582, describes techniques that apply attributed programmed graph grammars to the interpretation of circuit diagrams and flowcharts. Section II on pages 574–577 explains attributed programmed graph grammars. Section III on pages 577–582 describes application to line drawing interpretation, including circuit diagrams and flowcharts. A circuit diagram given in terms of lines can be interpreted, and an output graph representing an interpretation result can be obtained. FIG. 10 shows an overview of a system for obtaining an output graph from an input image. An input graph obtained from an input image is transformed into an output graph by applying productions according to a control diagram. Page 580 describes error correction, and FIG. 20 illustrates a distorted version of a circuit diagram with errors that can be corrected. Flowchart interpretation is illustrated in FIGS. 18 and 19, described on page 581.

The Ricoh Imagio MF530 Series General Catalog, Ricoh K.K., 1992, describes AI copying functions at pages 23 and 24. Page 23 mentions that hand-drawn numerals are converted "as is" into graphs and that hand-drawn lines are converted into straight lines. Page 23 shows how different types of graphs can be created by writing numerals by hand on a form. Page 24 shows how hand-drawn charts, including a flow chart and two others that appear to have nodes and links, can be cleanly traced and thus made easier to see.

SUMMARY OF THE INVENTION

The invention is based on the recognition of a basic problem that arises in analyzing images that show node-link structures such as directed graphs, undirected graphs, trees, flow charts, circuit diagrams, state-transition diagrams, and other graphical representations that include structures of nodes and links. Analysis of an image showing a node-link structure often requires resolution of ambiguity. For example, a node-link structure may include labels for the nodes and links, and the labels may include connected components that resemble nodes or links. The usefulness of node-link structures for communicating information to a machine is limited by ambiguity.

The invention is based on the discovery of an image analysis technique that alleviates the problem of resolving ambiguity in node-link structures. The technique analyzes an image set that shows a node-link structure to obtain information about the nodes and links. The node-link structure satisfies constraints on nodes, on links, and on node-link structures. The image set can, for example, show a sketch that includes nodes and links forming the node-link structure. Or the image set can include a first image and the second image, where the second image is an overlay showing nodes and links that form the node-link structure when combined with features shown in the first image; the overlay can show editing marks. Because the node-link structure satisfies the constraints, the image set can be analyzed using the constraints to obtain accurate information about the node-link structure.

The technique can obtain data defining an input image set showing nodes and links that form a node-link structure. The technique can use the input image data to obtain likely node-link data indicating parts of the input image set that satisfy the constraint on nodes and parts that satisfy the constraint on links. The technique can then use the likely node-link data to obtain constrained node-link data indicating subsets of the likely nodes and links that satisfy a constraint on node-link structures.

The constraints on nodes and links ensure that the technique can automatically obtain the likely node-link data. The constraint on node-link structures ensures that the technique can automatically obtain the constrained node-link data. Constraints on nodes and links can be enforced by applying appropriate criteria to an input image. A constraint on node-link structures can be applied iteratively to the likely nodes and links, searching for likely nodes and links that satisfy the constraint through a form of constraint propagation. Each iteration can apply appropriate criteria to the likely nodes and links, and the constraint can propagate until an iteration produces no change in the likely nodes and links that satisfy the constraint.

The technique can, for example, obtain the likely node-link data by applying criteria for nodes and links to connected components in the image set. A node criterion can require a connected component to enclose more pixels than are in the connected component and a link criterion can require a connected component to enclose less pixels than are in the connected component. If appropriate, a link criterion can also require that the connected component have an end that meets a head criterion and another end that meets a tail criterion; a link criterion of this sort is useful in analyzing directed graphs, flow charts, circuit diagrams, and other node-link structures in which a link can be directed from one node to another.

The likely node-link data can include two versions of the image set, one indicating pixels in parts that meet the node criterion and the other indicating pixels in parts that meet the link criterion. For example, each indicated pixel could be ON, and other pixels could be OFF. Or each indicated pixel could be labeled with an integer uniquely indicating the part that includes it.

The technique can similarly obtain the constrained node-link data by iteratively applying nearness criteria to the likely nodes and likely links. Each iteration can apply a link nearness criterion to the likely nodes remaining after the previous iteration and can apply a node nearness criterion to the likely links remaining after the previous iteration. The link nearness criterion can require that a node be the nearest node to one of the links. The node nearness criterion can require that the length of a link be greater than a distance from the end of the link to a node. The constrained node-link data are obtained when each remaining likely node or link meets the applicable nearness criterion so that no change occurs during an iteration.

As above, the constrained node-link data can include two versions of the image set, one indicating pixels in parts that meet the node criterion and the link nearness criterion and the other indicating pixels in parts that meet the link criterion and the node nearness criterion. The constrained node-link data can also include a list of nodes and a list of links. Each link can be defined as an ordered pair of the nodes.

The technique can store the constrained node-link data or use it somehow. For example, the technique can use the constrained node-link data to provide control signals to a system. Or the technique can use the constrained node-link data to obtain data defining an image of a precisely formed node-link structure similar to the analyzed node-link structure. Or the technique can use the constrained node-link data to provide data indicating editing operations to be performed on one of the images in the image set to obtain an edited image. Or the technique can use the constrained node-link data to obtain data indicating a control structure for a graphical programming language or to interpret a node-link structure in the form of code for a graph algorithm that can then be executed.

The technique can be implemented with a machine that includes image input circuitry and data indicating image processing instructions. The image input circuitry can receive data defining an image set that shows a node-link structure. The machine's processor can execute the image processing instructions. In executing the image processing instructions, the processor can receive the image data from the image input circuitry and use the image data to obtain likely node-link data indicating parts of the input image set that satisfy a constraint on nodes and parts that satisfy a constraint on links. The processor can then use the likely node-link data to obtain constrained node-link data indicating subsets of the likely nodes and likely links that satisfy a constraint on node-link structures. The machine can be a high-speed image processing server that responds to image processing requests from a network to which it is connected.

The machine can also include image output circuitry, and the processor can use the constrained node-link data to obtain output image data defining an output image that includes a node-link structure similar to the analyzed node-link structure or defining an output image that shows an edited version of one of the images in the image set. The machine can be a fax server or a copier.

The technique can also be implemented in a software product that includes a storage medium and data stored by the storage medium. The software product can be used in a machine that includes image input circuitry. The data stored by the storage medium can include image processing instructions the machine's processor can execute. In executing the image processing instructions, the processor can receive image data from the image input circuitry defining an image set that shows a node-link structure and use the image data to obtain likely node-link data indicating parts of the input image set that satisfy a constraint on nodes and parts that satisfy a constraint on links. The processor can then use the likely node-link data to obtain constrained node-link data indicating subsets of the likely nodes and likely links that satisfy a constraint on node-link structures.

The technique described above is advantageous because it enables a computer to obtain data about a node-link structure. A user can, for example, provide a simple sketch of a node-link structure for analysis. The nodes and links can be of any shapes that meet appropriate constraints, and the technique can therefore handle a wide variety of different node and link shapes. The technique can provide data that can be used to control a system. Or the data can be used to produce a precisely formed image of the node-link structure. Or the data can be used to edit an input image. In addition, the technique is advantageous because it obtains information about node-link structures iteratively, propagating a constraint until stability is reached to obtain as much information as possible about a node-link structure.

The technique of obtaining likely node-link data indicating nodes that satisfy a constraint on nodes and links that satisfy a constraint on links and then using the likely node-link data to iteratively obtain constrained node-link data indicating subsets of the likely nodes and links that satisfy a constraint on node-link structures is especially advantageous because it avoids treating certain items inappropriately. For example, if a link criterion, by itself, would treat some marks as links even though they are link labels or otherwise extraneous marks, a link nearness criterion can be iteratively applied to eliminate the false positives and to obtain a subset of links that satisfy a link nearness constraint on node-link structures.

The following description, the drawings, and the claims further set forth these and other aspects, objects, features, and advantages of the invention.

Figure 12:
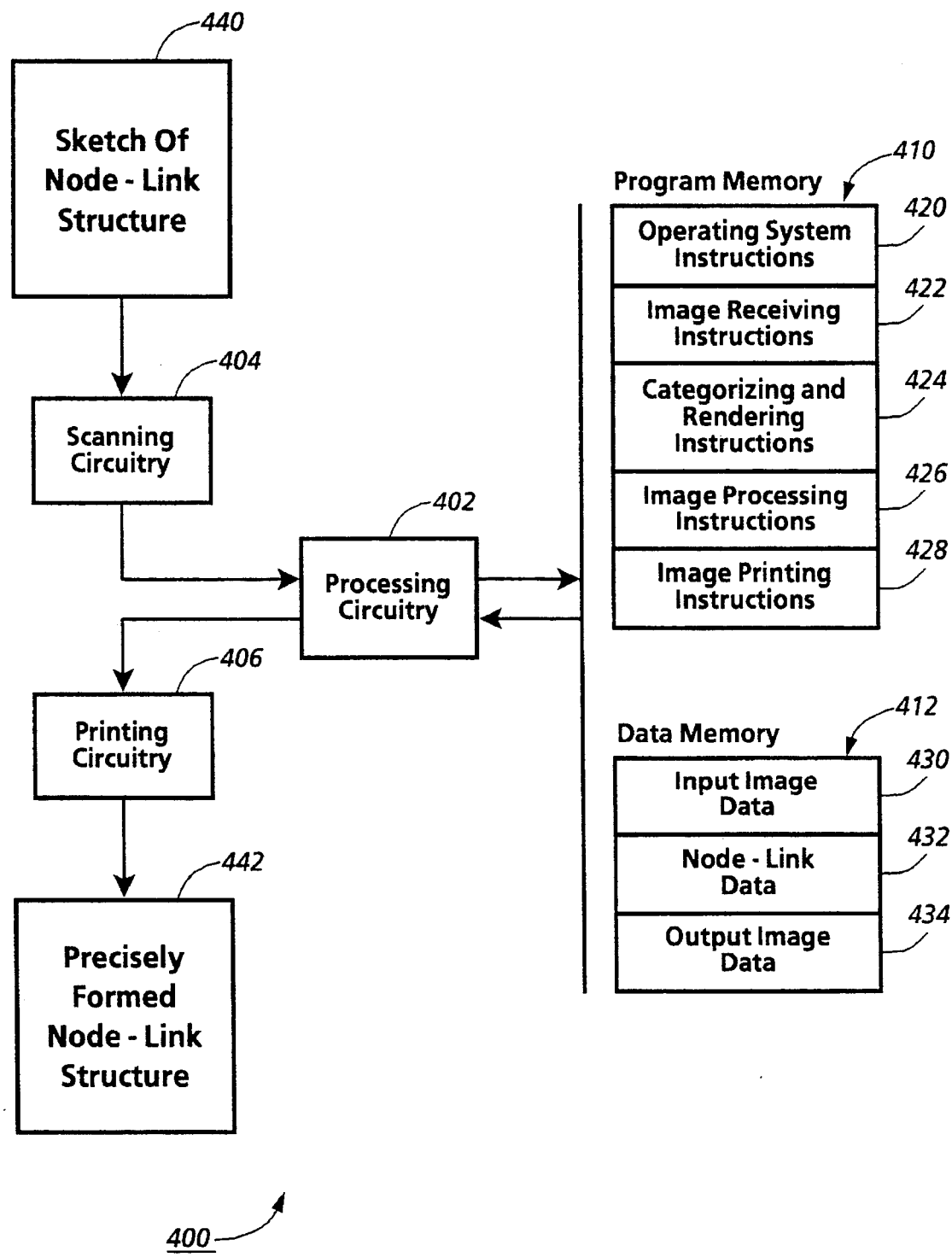
FIG. 12 is a schematic block diagram showing components of a system that can use data defining an image of a sketch of a node-link structure to obtain data defining an image of a precisely formed node-link structure.
Figure 13:
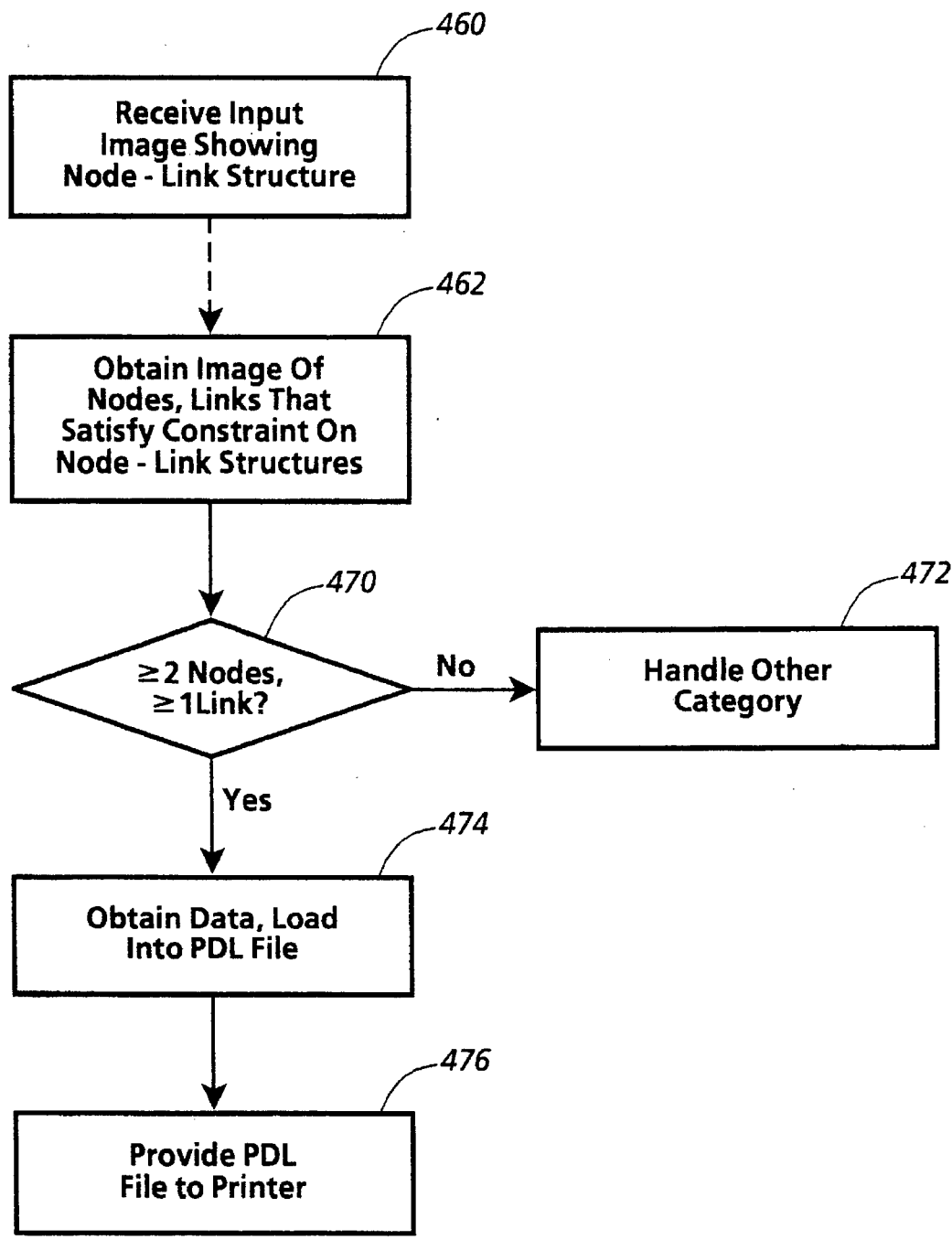
FIG. 13 is a flow chart of acts performed by the system of FIG. 12.

Each of FIGS. 14–17 shows an example of a sketch of a node-link structure and a precisely formed node-link structure obtained using the techniques of FIGS. 12 and 13.

Figure 18:
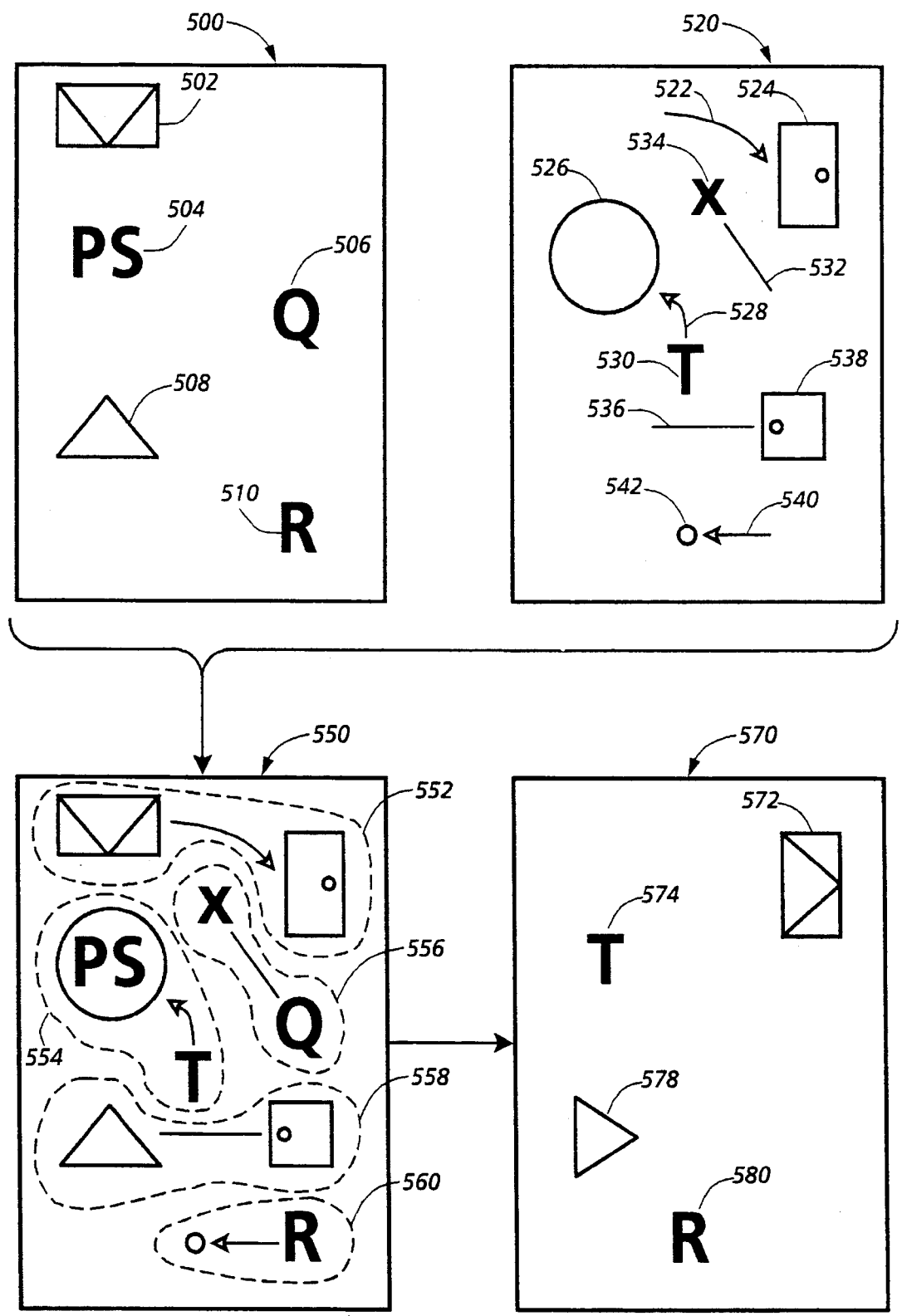

FIG. 18 is a schematic diagram showing ways in which two sheets can show nodes and links that together define node-link structures indicating editing operations.

Figure 19:
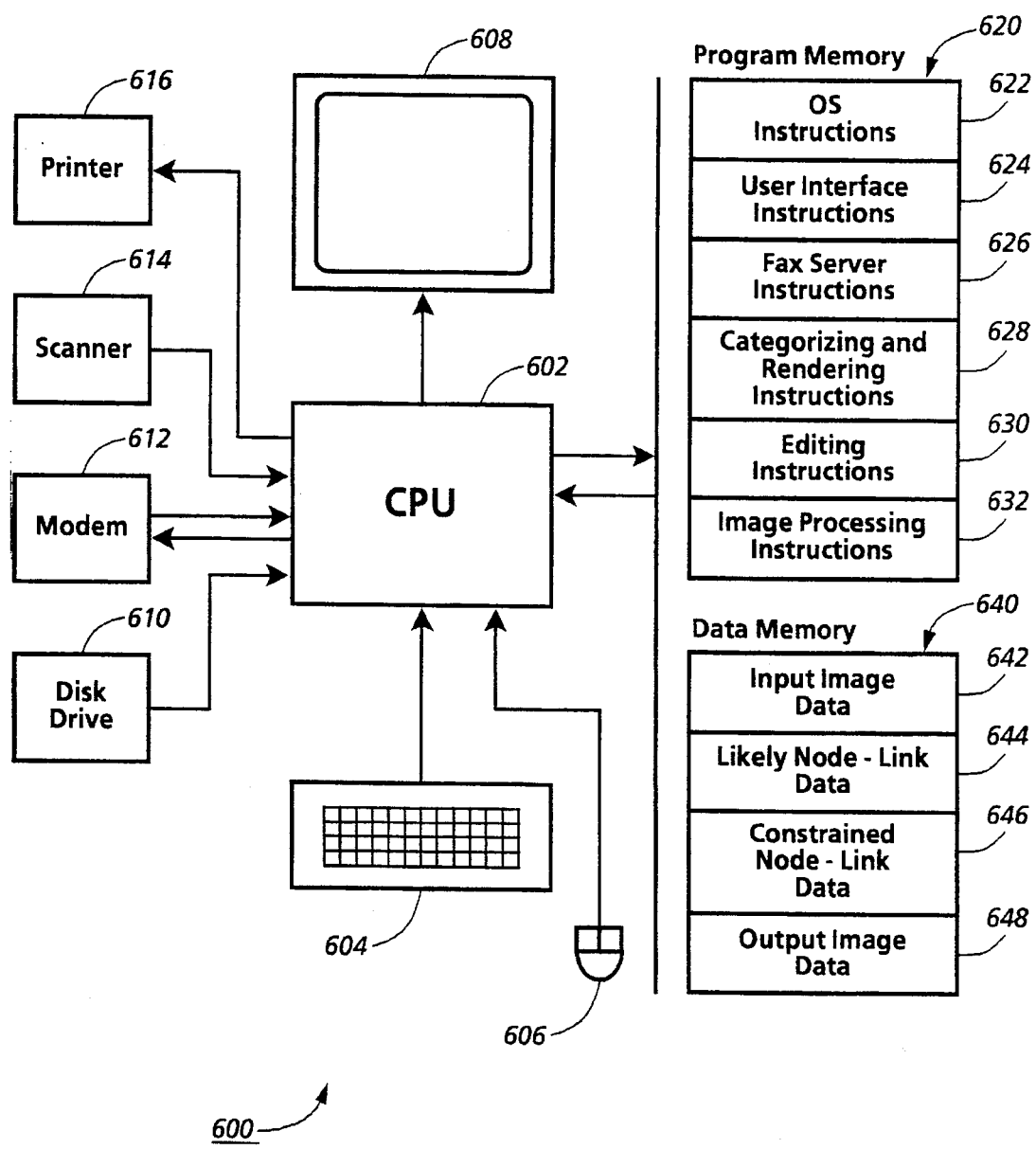

FIG. 19 is a schematic block diagram of a fax server application.

Figure 20:
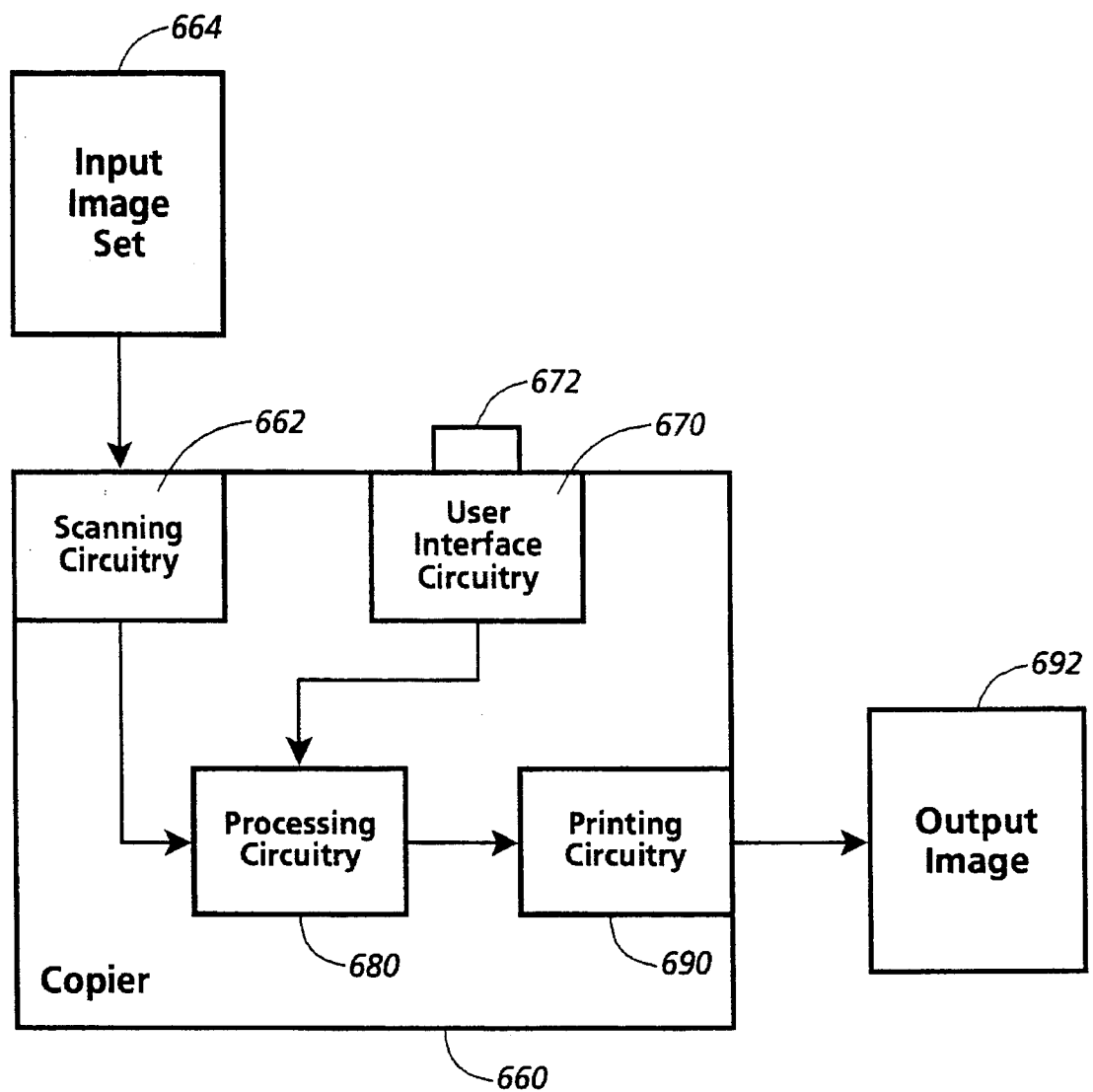

FIG. 20 is a schematic block diagram of a copier application.

DETAILED DESCRIPTION

A. Conceptual Framework

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media. "Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A "control signal" is a signal provided to a machine or other system that can cause a change in the system's state, such as by changing the way in which the system operates. In executing a set of instructions, a processor may, for example, provide control signals to internal components within the processor and to external components connected to the processor, such as input/output devices.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature. An image set "shows" a feature when the image set includes one or more images that, separately or in combination, show the feature. An item of data "defines" a feature when the item defines an image set that shows the feature.

A "graphical representation" is a graphical feature that includes elements that are spatially related in a configuration that represents information.

An image may be divided into "segments," each of which is itself an image. A segment of an image may be of any size up to and including the whole image.

An image or image set may be analyzed into "parts," each of which is smaller than the whole image or image set. Each part includes one or more segments of the image or segments of images in the image set.

An item of data "defines" an image when the item of data includes sufficient information to produce the image. For example, a two-dimensional array can define all or any part of an image, with each item of data in the array providing a value indicating the color of a respective location of the image.

A "data image" is an item of data defining an image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

A "human-produced image" is an image that shows marks made by hand by a human, by a machine under control of a human, or in some other way in which a human can provide marks.

The term "mark" includes a single mark and also plural marks that together form a pattern of marks.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

A "version" of a first image is a second image produced using an item of data defining the first image. The second image may be identical to the first image, or it may be modified by loss of resolution, by changing the data defining the first image, or by other processes that result in a modified version.

Each location in an image may be called a "pixel." In an array defining an image in which each item of data provides a value, each value indicating the color of a location may be called a "pixel value." A pixel's value in an image that is a version of another image may indicate an attribute of a region of the other image that includes the pixel.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "bounding box" for a connected component is a rectangle just large enough to include all the pixels in the connected component, and can be specified by coordinates.

A "constraint" on parts of images or of image sets or on features shown by images or by image sets is a requirement or other limitation that the parts or features must satisfy.

An operation uses data to "determine" whether a proposition is true if the operation uses the data to obtain other data indicating whether the proposition is true. For example, an operation can use data defining an image to determine whether parts of the image satisfy a constraint, in which case the operation will obtain data indicating whether the image includes parts that satisfy the constraint.

A criterion is an example of a constraint. If a criterion "requires" a part of an image or of an image set with a characteristic or that has a characteristic, only parts with the characteristic or that have the characteristic meet the criterion.

A first item of data is produced by "applying a criterion" to a second item of data when the first item indicates whether the second item meets the criterion. An operation that applies a criterion produces such an item of data.

A criterion can be "applied" to a connected component or other part of an image or of an image set by applying the criterion to an item of data defining the image in a manner that depends on the connected component or other part. A connected component or other part of an image or of an image set "meets a criterion" if application of the criterion to the part produces an item of data indicating that the part meets the criterion. Numerous criteria can be applied to connected components and other parts of an image or of an image set. For example, a criterion can require a connected component to enclose more pixels or less pixels than the pixels in the connected component; a criterion can require a connected component to be the connected component nearest to another connected component; or a criterion can require a connected component to have a length that is greater than its distance to another connected component.

An operation includes a "sequence of iterations" when the operation includes a sequence of substantially similar sub-operations, each referred to as an "iteration," where each iteration after the first uses starting data produced by the preceding iteration to obtain ending data. Each iteration's ending data can in turn be used by the following iteration. A "change occurs" during an iteration if the iteration's ending data is different than its starting data; an iteration during which no change occurs can be the last iteration, because no change will occur during further iterations.

A sequence of iterations "propagates" a constraint if each iteration includes an operation that determines whether items indicated by its starting data satisfy the constraint, and obtains ending data that indicates only the items that satisfy the constraint. For example, if the starting data and ending data define images, the ending data could define an image that includes only the parts of the starting image that satisfy the constraint.

An operation uses data to "determine" whether a proposition is true if the operation uses the data to obtain other data indicating whether the proposition is true. For example, an operation can use data defining an image showing a graphical feature to determine whether the graphical feature satisfies a constraint, in which case the operation will obtain data indicating whether the graphical feature satisfies the constraint.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

A "structure" is a graphical feature that includes other graphical features that are perceptible as interrelated.

A "node-link structure" is a structure that includes graphical features that can be distinguished into "nodes" and "links" with each link relating two nodes to each other or relating a node to itself. Examples of node-link structures include directed graphs, undirected graphs, trees, flow charts, circuit diagrams, and state-transition diagrams.

One node-link structure is "similar to" another node-link structure when the two node link structures include nodes and links that are related in substantially the same way.

A "constraint on nodes" is a constraint that is satisfied by parts of an image or of an image set that show nodes. Similarly, a "constraint on links" is a constraint that is satisfied by parts of an image or of an image set that show links. Also, a "constraint on node-link structures" is a constraint that is satisfied by parts of an image or of an image set that, together, show a node-link structure.

Parts of an image or of an image set or features shown by an image or image set "satisfy a constraint on node-link structures" if the parts or features, taken together, satisfy the constraint.

B. General Features

Figure 1:
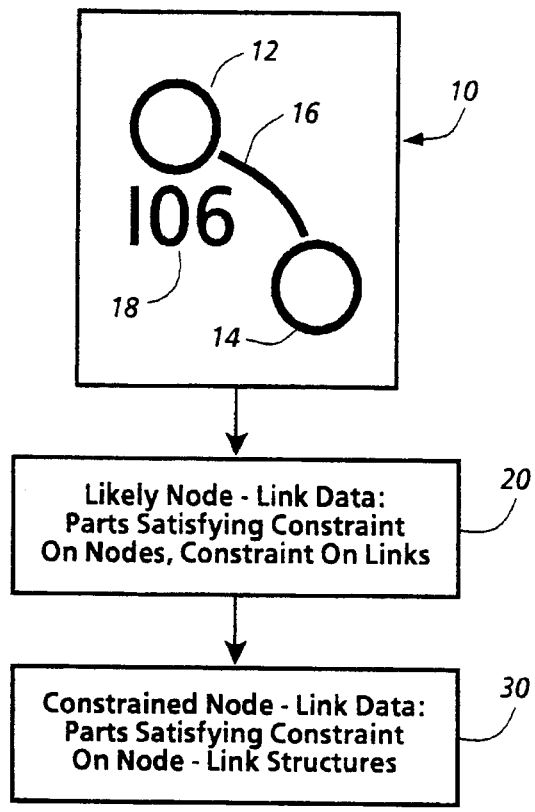
FIG. 1 is a schematic diagram showing how an image showing a node-link structure can be analyzed to obtain data indicating parts that satisfy a constraint on node-link structures.
Figure 2:
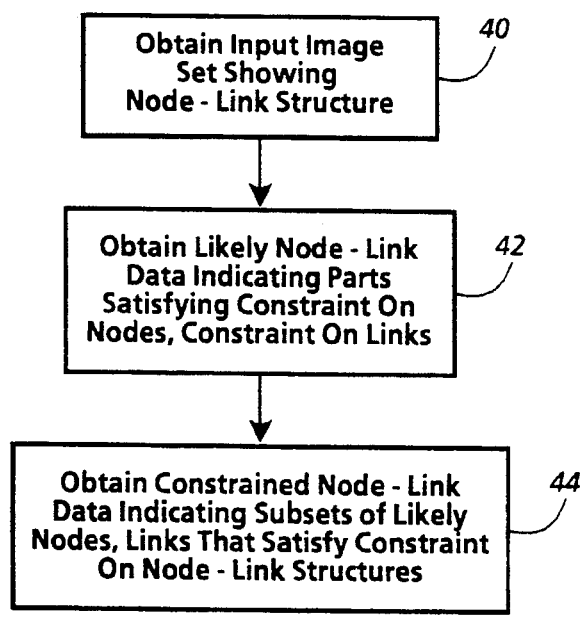
FIG. 2 is a flow chart showing general acts in analyzing an image showing a node-link structure to obtain data indicating parts that satisfy a constraint on node-link structures.
Figure 3:
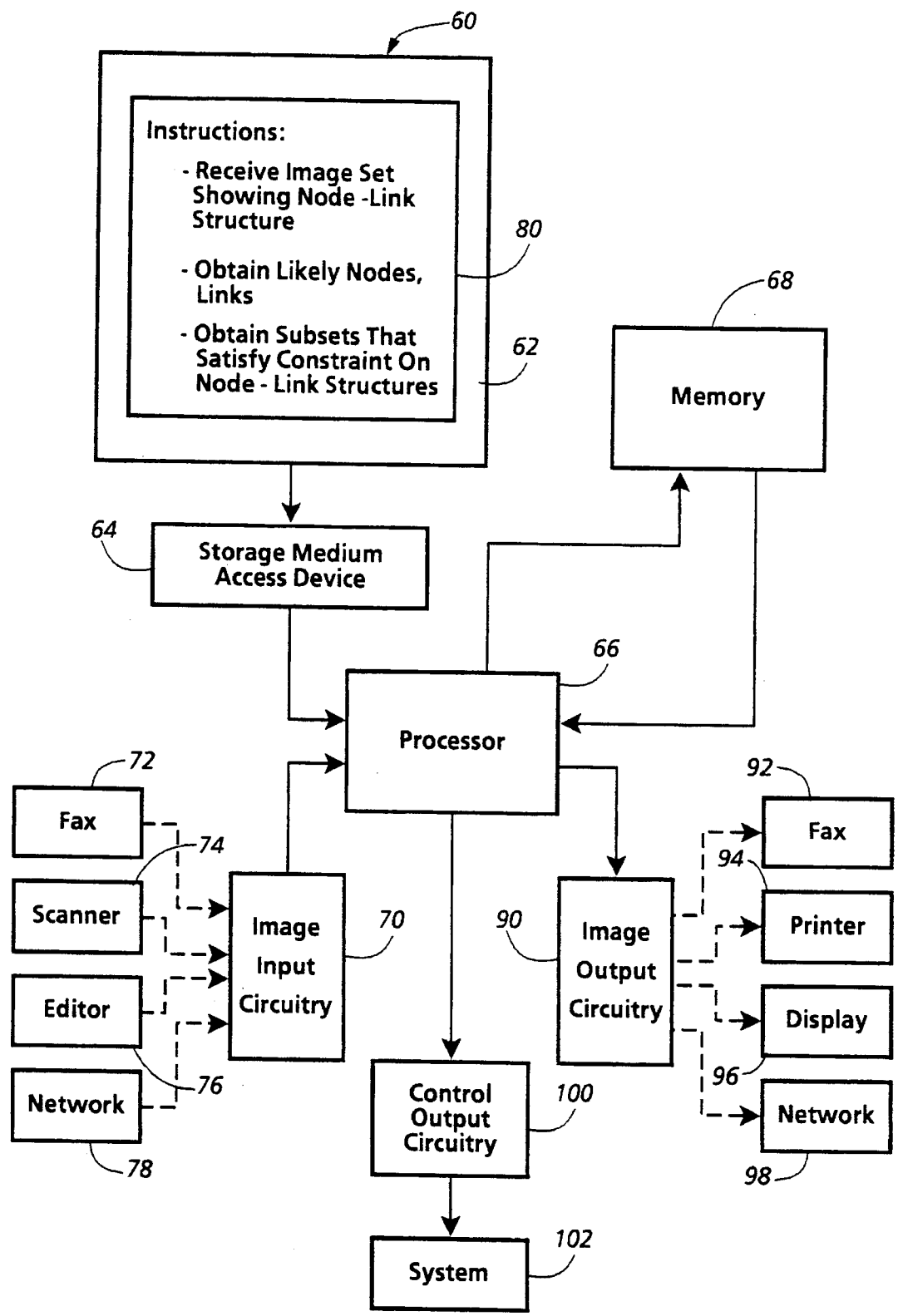
FIG. 3 is a schematic block diagram showing general components of a software product and a machine in which the software product can be used to implement the general acts in FIG. 2.

FIGS. 1–3 show general features of the invention. FIG. 1 shows schematically how an image showing a node-link structure can be analyzed. FIG. 2 shows general acts in analyzing a node-link structure. FIG. 3 shows general components of a software product and of a machine in which it can be used.

In FIG. 1, image 10 shows a node-link structure. Image 10 can, for example, be a human-produced image showing a sketch. The node-link structure includes nodes 12 and 14, link 16, and label 18. Label 18 is illustratively the number "106," which produces ambiguity because the digits "1" and "6" may satisfy a link criterion and the digit "0" may satisfy a node criterion. Because of these ambiguities, analysis of image 10 may yield false positives, meaning nodes and links that are not part of the node-link structure.

A machine receiving data defining image 10 can respond by automatically obtaining likely node-link data 20 indicating parts of image 10 that satisfy a constraint on nodes and parts that satisfy a constraint on links. The parts that satisfy the constraint on nodes might thus include not only nodes 12 and 14, but also the digit "0" in label 18. The parts that satisfy the constraint on links might include not only link 16, but also the digits "1" and "6" in label 18. Then the machine can use likely node-link data 20 to automatically obtain constrained node-link data 30 indicating a subset of the likely nodes and a subset of the likely links. The subsets satisfy a constraint on node-link structures so that the subsets include only nodes 12 and 14 and link 16, and do not include any of the digits in label 18.

The general acts in FIG. 2 begin in box 40 by obtaining input image data defining an input image set that shows a node-link structure. In response, the act in box 42 uses the input image data to obtain likely node-link data indicating parts of the input image set that satisfy a constraint on nodes and parts that satisfy a constraint on links. The act in box 44 then uses the likely node-link data to obtain constrained node-link data indicating subsets that satisfy a constraint on node-link structures. The act in box 44 is necessary to eliminate false positives resulting, for example, from labels, and can include iterative constraint propagation if appropriate.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions that processor 66 can execute and also data memory storing data that processor 66 can access in executing the instructions.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

In addition to data storage medium 62, software product 60 includes data stored by storage medium 62. The stored data include data indicating image processing instructions 80, which processor 66 can execute to perform acts like those in FIG. 2. In executing instructions 80, processor 66 receives input image data defining an input image set from image input circuitry 70. The input image set shows a node-link structure. Processor 66 uses the input image data to obtain likely node-link data indicating parts of the input image set that satisfy a constraint on nodes and parts that satisfy a constraint on links. Processor 66 then uses the likely node-link data to obtain constrained node-link data indicating subsets of the likely nodes and likely links that satisfy a constraint on node-link structures.

Processor 66 can also be connected for providing data defining images to image output circuitry 90. For example, software product 60 could include data indicating instructions processor 66 can execute to use the constrained node-link data to obtain output image data defining an output image. The output image could show a more precisely formed version of the node-link structure, for example, or an edited version of an image in the input image set. The output image data could be provided to image output circuitry 90, and could in turn be provided to fax machine 92, to printer 94, to display 96, or to network 98.

The constrained node-link data could also be used to provide control signals. For example, memory 68 could store control instructions processor 66 can execute to use the parameter data to obtain control data defining control signals. The control data could be provided to control output circuitry 100, which could respond by providing control signals to system 102.

Rather than being used immediately, the constrained node-link data could instead be stored in memory 68 for possible future use. This would be appropriate, for example, where information indicating an operation to be performed on an input image set has not been obtained at the time data defining the input image set is received.

C. Implementation

The general features described above could be implemented in numerous ways on various machines to analyze node-link structures. Implementations described below analyze node-link structures and use the results to control a graphic rendering system.

1. Image Showing Node-Link Structure

Figure 4:
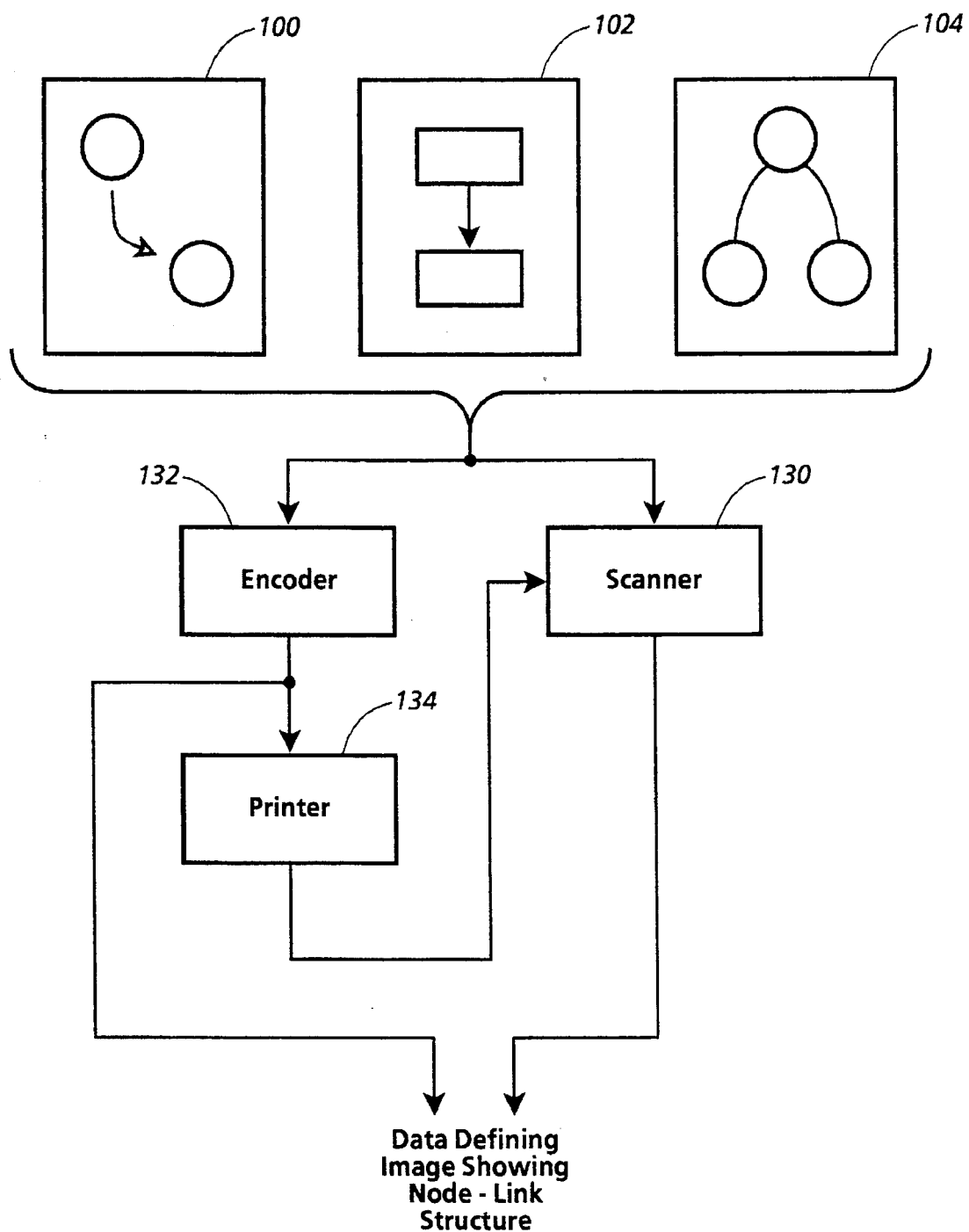
FIG. 4 is a schematic block diagram showing sketches of node-link structures and ways in which a user can provide data defining a human-produced image showing a node-link structure made by hand.
Figure 5:
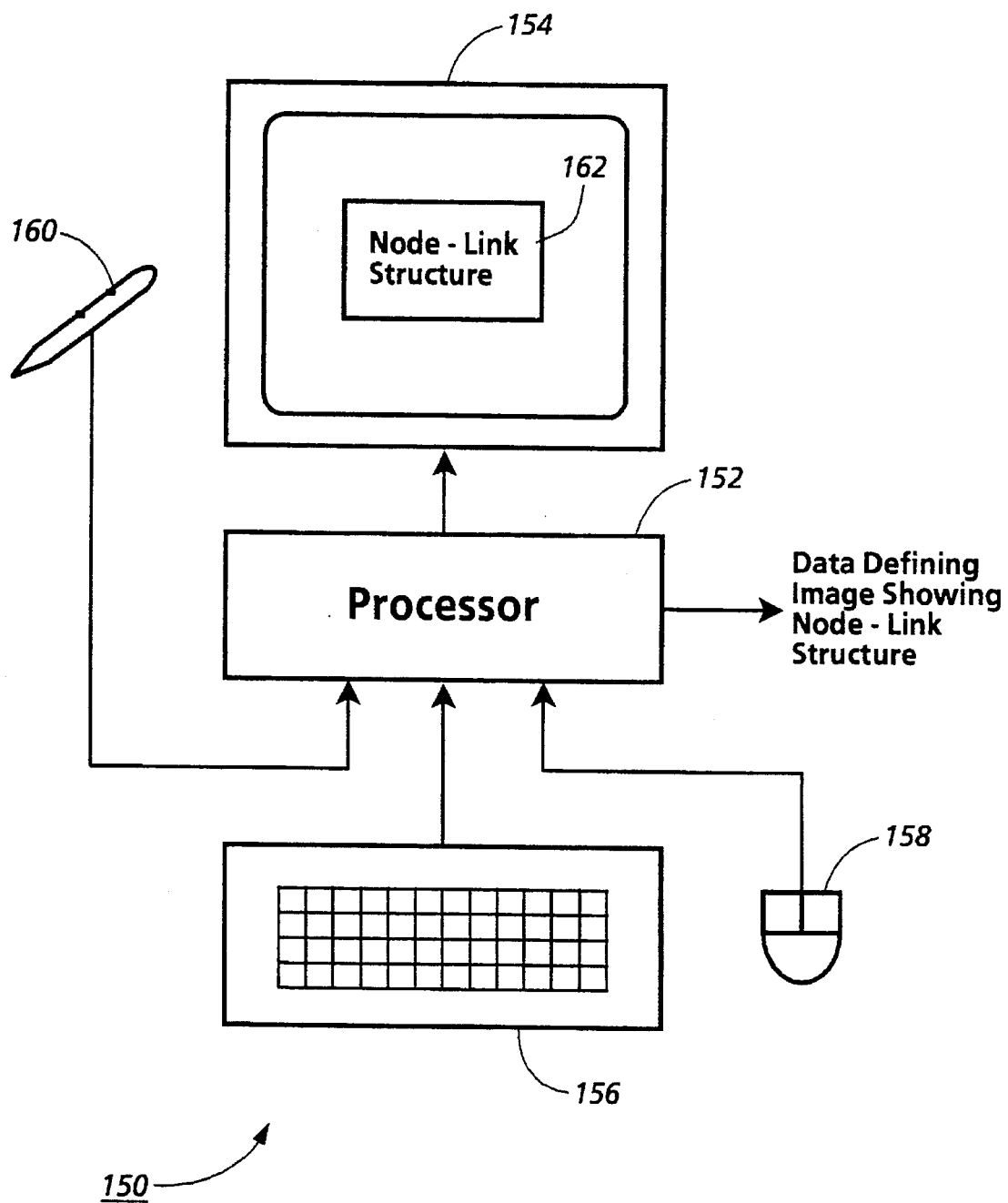
FIG. 5 is a schematic block diagram showing how a user can provide data defining a human-produced image showing a node-link structure produced interactively with a machine.

Data defining an image set showing a node-link structure can be obtained in many ways. FIG. 4 illustrates ways in which a user can provide an image showing a hand sketch of a node-link structure. FIG. 5 illustrates ways in which a user can provide an image showing a node-link structure by interacting with a machine.

FIG. 4 shows at left several examples of images showing node-link structures. Image 100 shows a directed graph such as a state-transition diagram; image 102 a flow chart; and image 104 a tree. Any of the images in FIG. 4 could be a human-produced image that shows a sketch made by marking actions performed on a marking medium by hand. Or the images could be obtained in any other appropriate way.

If the marking medium is a sheet, scanner 130 can receive the sheet. Scanner 130 operates on the sheet to provide data defining an image showing a node-link structure.

If the marking medium is a marking surface of an electronic device that can sense marks, encoder 132 can receive signals from the electronic device and use the signals to obtain data defining an image showing a node-link structure. This data can then be provided to printer 134 to obtain a sheet on which marks are printed, and this sheet can be provided to scanner 130. Scanner 130 provides data defining an image showing a node-link structure.

FIG. 4 also shows that data from encoder 132 could be used directly as data defining an image showing a node-link structure. This would be appropriate if encoder 132 could provide data defining an image in response to marking actions.

FIG. 5 shows machine 150, which could be a personal computer, a workstation, or another data processing system. Machine 150 includes processor 152; display 154; keyboard 156; pointing device 158, illustratively a mouse; and screen position indicating device 160, illustratively a stylus. A user can operate keyboard 156 and pointing device 158 to provide signals to processor 152. Or a user can perform marking actions with screen position indicating device 160 on the surface of display 154 to provide signals to processor 152. In response, processor 152 presents and modifies image 162 on display 154, so that the user can continue to provide signals until image 162 shows a desired node-link structure. Then the user can provide a signal requesting that processor 152 provide data defining image 162.

Processor 152 could execute a number of types of software to permit a user to produce an image in the manner described above. Processor 152 could execute document editing software or image editing software, for example.

In implementing the general features described above, an image set showing a node-link structure could be produced in any of the ways shown in FIGS. 4 and 5 or in any other appropriate way. The node-link structure, however, must satisfy appropriate constraints so that it can be analyzed.

2. Obtaining Node-Link Data

Figure 6:
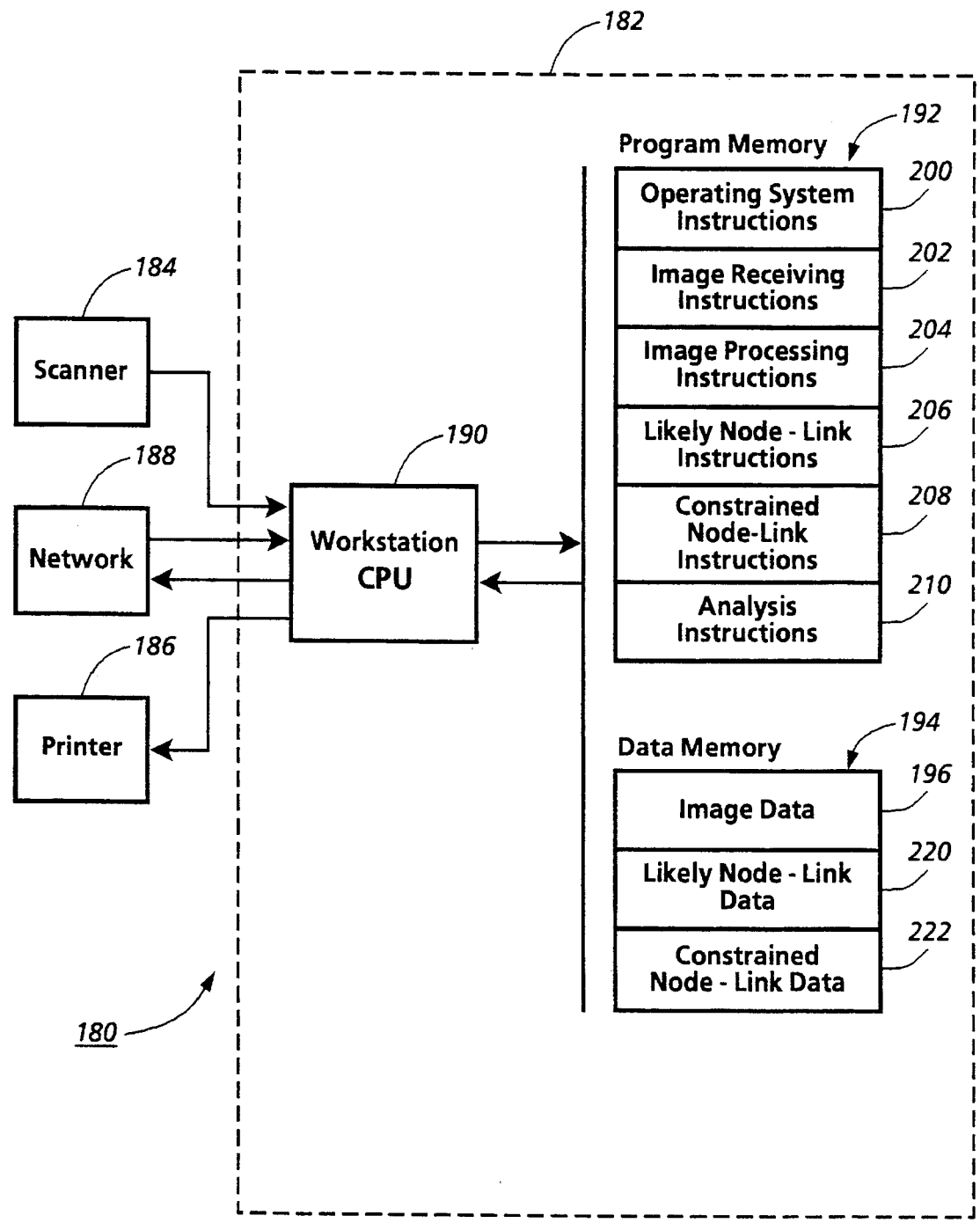
FIG. 6 is a schematic block diagram of a machine that can analyze a node-link structure.
Figure 7:
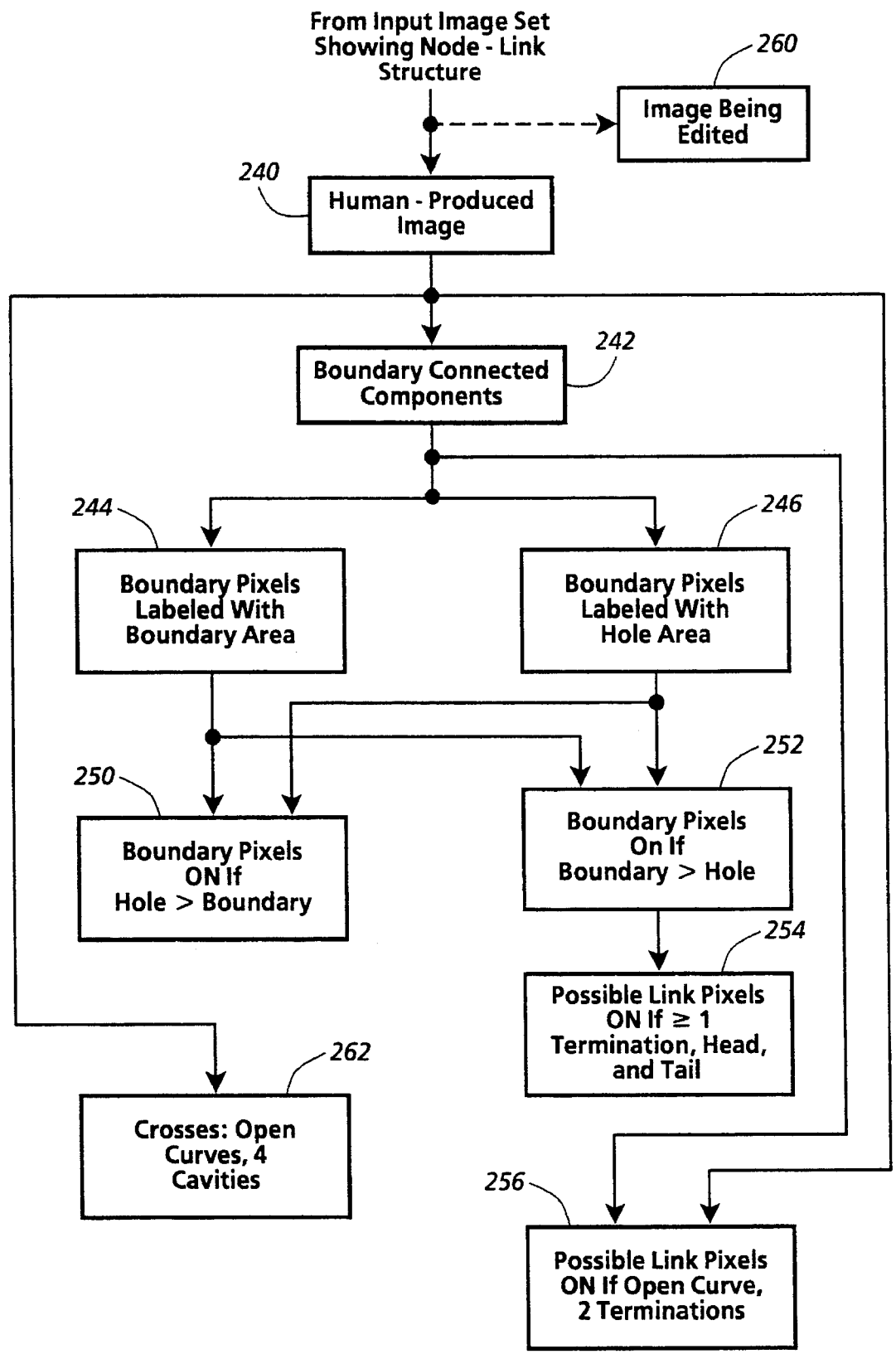
FIG. 7 is a schematic flow diagram of data images used in obtaining data indicating parts of an image that satisfy a constraint on nodes and parts that satisfy a constraint on links.
Figure 8:
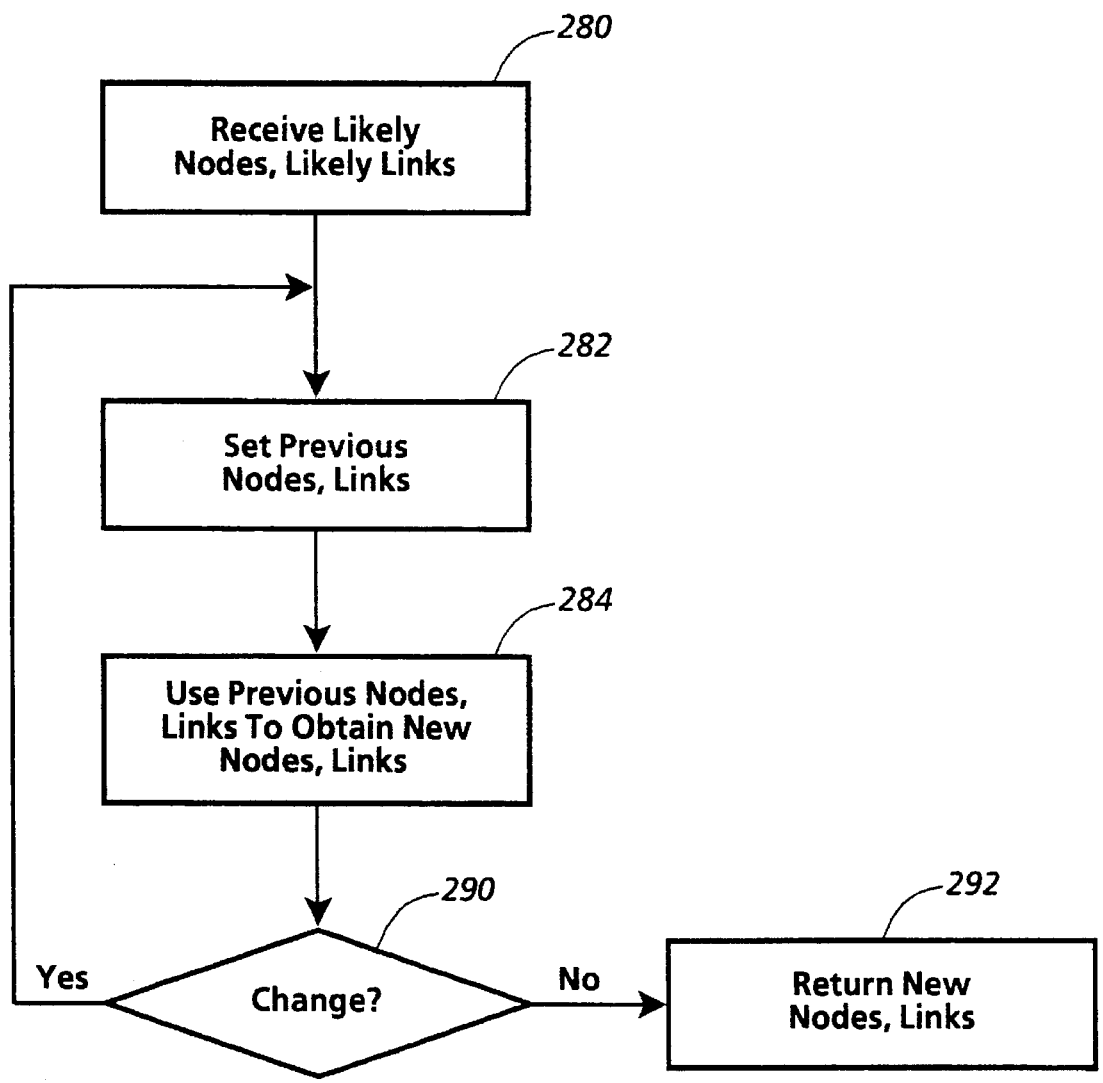
FIG. 8 is a flow chart of acts in obtaining data indicating subsets of likely nodes and likely links that satisfy a constraint on node-link structures.
Figure 9:
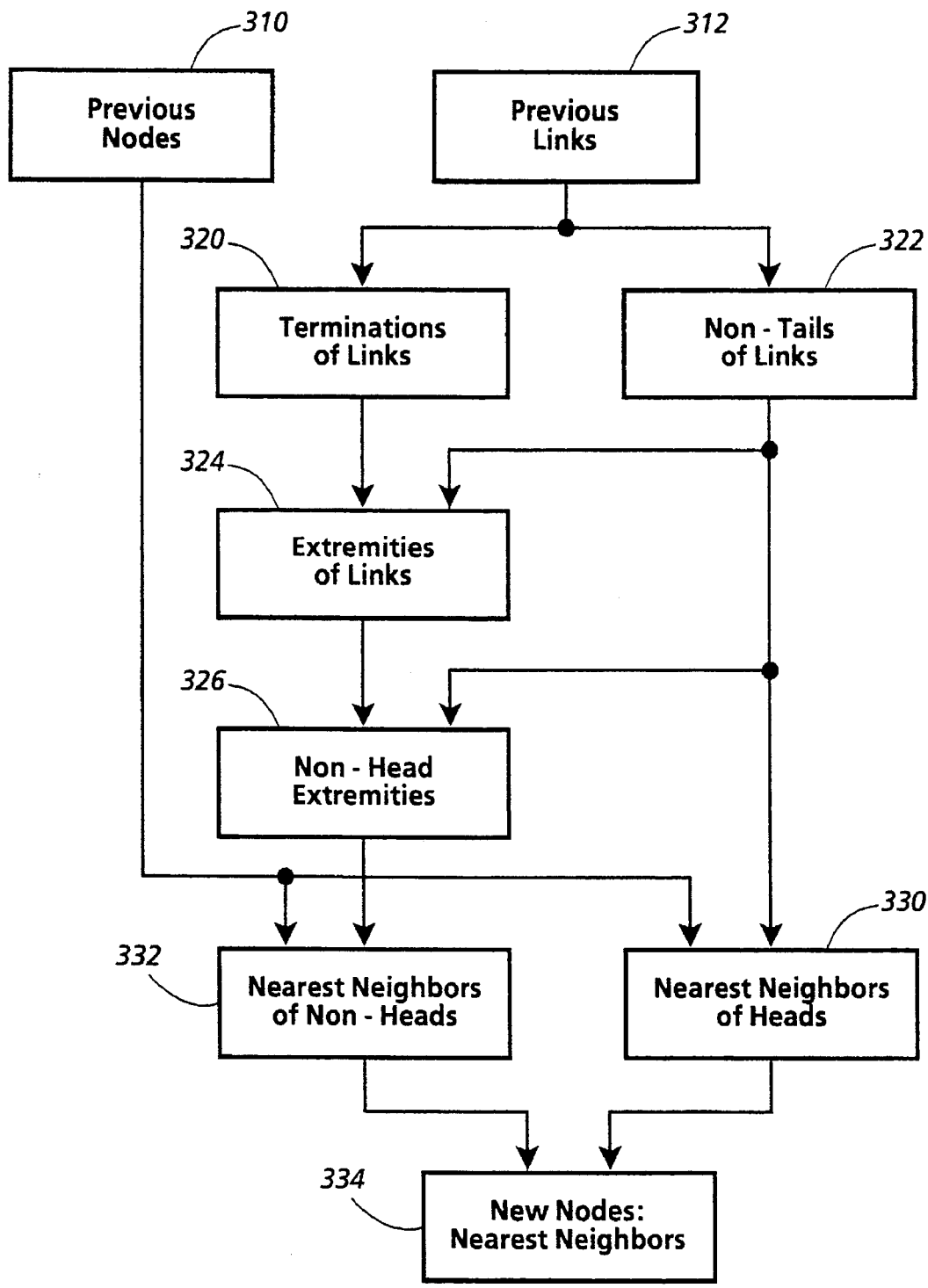
FIG. 9 is a schematic flow diagram of data images used in obtaining new nodes from previous nodes and previous links in FIG. 8.
Figure 10:
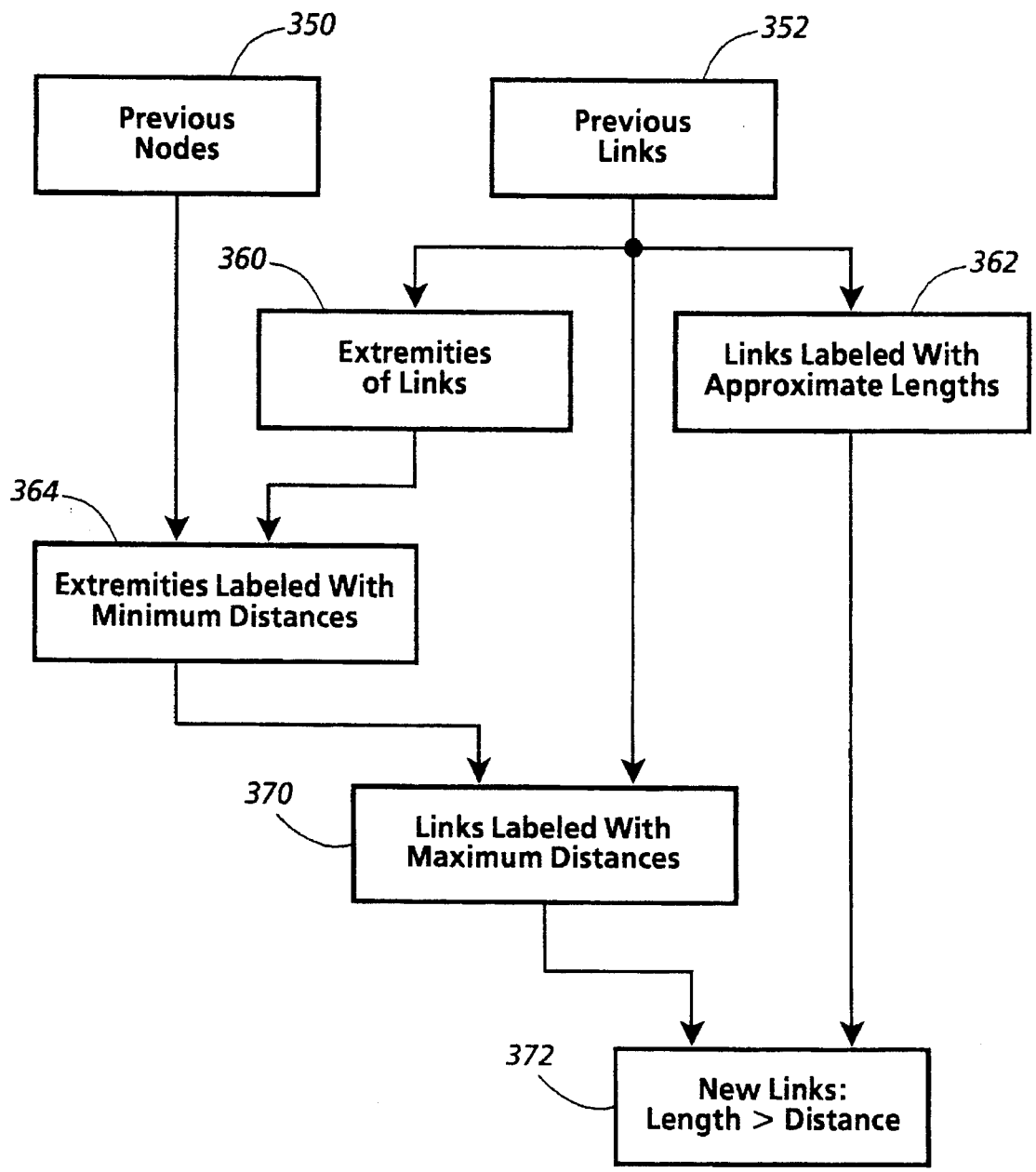
FIG. 10 is a schematic flow diagram of data images used in obtaining new links from previous nodes and previous links in FIG. 8.

FIG. 6 shows a system in which the general features described above have been implemented. FIG. 7 shows data images obtained in executing likely node-link instructions in FIG. 6. FIG. 8 shows acts in executing constrained node-link instructions in FIG. 6. FIG. 9 shows data images obtained in using previous nodes and previous links to obtain new nodes in FIG. 8. FIG. 10 shows data images obtained in using previous nodes and previous links to obtain new links in FIG. 8.

System 180 in FIG. 6 includes workstation 182, a Sun SPARCStation 10 workstation. Scanner 184 can be a conventional scanner such as a Xerox Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining an image showing a node-link structure from scanner 184 as described above in relation to FIG. 4. Similarly, CPU 190 can receive data defining an image obtained in the manner described above in relation to FIG. 5 from network 188. In addition, workstation CPU 190 is connected to access program memory 192 and data memory 194 and other conventional workstation peripherals (not shown). Data memory 194 is illustratively storing image data 196 defining an image set showing a node-link structure.

Program memory 192 stores instructions CPU 190 can execute to perform operations implementing the general acts in FIG. 2. CPU 190 executes operating system instructions 200 that provide a Unix operating system or other appropriate operating system. Each of the other sets of instructions stored by program memory 192 can be obtained from source code in a conventional programming language such as Lisp, C, or the like with conventional compiler or interpreter techniques. When executed, these other instructions make calls to operating system instructions 200 in a conventional manner. In general, the instructions can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180.

In executing image receiving instructions 202, CPU 190 receives data defining an image set and stores it in data memory 194, as illustrated by image data 196. The data defining the image set may be received from scanner 184 or network 188.

In executing image processing instructions 204, CPU 190 calls likely node-link instructions 206 and constrained node-link instructions 208. Image processing instructions 204 also perform other operations relating to analysis of node-link structures.

In executing likely node-link instructions 206, CPU 190 calls analysis instructions 210 to perform basic geometric analysis of the image set defined by image data 196, producing likely node-link data 220. Likely node-link data 220 indicate parts of the image set that satisfy a constraint on nodes and parts that satisfy a constraint on links.

In executing constrained node-link instructions 208, CPU 190 uses likely node-link data 220 to obtain constrained node-link data 222. Constrained node-link data 222 indicate subsets of the likely nodes and likely links that satisfy a constraint on node-link structures.

FIG. 7 shows items of data, each defining an image. Each item is referred to as a "data image." The data images are interconnected to show how some data images can be used in obtaining others. In general, all of the data images define images with the same number of pixels, and each operation produces an image with the same number of pixels. An operation on two images typically uses values of pairs of pixels to produce, for each pair, a pixel value in an image being produced; within each pair, one pixel is from each image and the two pixels in the pair are both at the same location as the pixel value in the image being produced.

Data image 240 in FIG. 7 is a human-produced image from an input image set showing a node-link structure. The input image set that includes data image 240 can therefore be obtained by executing image receiving instructions 202, as described above. Most of the remaining data images in FIG. 7 can be obtained by executing likely node-link instructions 204. Because data image 240 is a human-produced image, it includes parts that satisfy constraints set forth below, making it possible to automatically obtain information about the node-link structure.

Data image 242 defines an image showing only the connected components in data image 240 that enclose some white pixels. Data image 242 can be obtained from data image 240 by a sequence of operations.

One operation can obtain an internals data image showing only the connected components that are enclosed by other connected components. This can be done using the complement of data image 240. The intersection can be obtained of the complement with a data image in which the pixels of the image border are ON and all other pixels are OFF; as used here, "image border" means the set of pixels in an image that do not have a four-adjacent pixel in at least one direction. An exterior data image, showing black connected components in the complement that include black pixels in the intersection, can then be obtained by a coloring operation that leaves a pixel ON if there exists a pixel that is ON in the intersection to which it is four-connected in the complement.

The coloring operation can be implemented as a type of operation referred to herein as a spread operation. A spread operation begins by obtaining a labeled version of a first data image in which each pixel in a connected component in the first data image is labeled with a unique identifier for the connected component, as discussed below. In obtaining data image 242, each connected component in the complement data image is labeled with a unique number.

The labeled version of the first data image can be obtained by initializing a current label value and then scanning OFF pixels in the first data image until a transition from an OFF pixel to an ON pixel is found. If the ON pixel already has a label, its label becomes the temporary label value, and the scan can continue across any following ON pixels, labeling each with the temporary label value until reaching a transition from an ON pixel to an OFF pixel. But if the ON pixel at a transition from OFF to ON does not have a label, the scan can increment the current label value, label the ON pixel with the incremented current label value, then follow the boundary between ON pixels and OFF pixels that runs through the newly labeled ON pixel in either a clockwise or counterclockwise direction, labeling each ON pixel on the boundary with the same current label value. Upon again reaching the first ON pixel that was labeled with the current label value, the scan can continue across the connected component, labeling ON pixels with the current label value until it reaches a transition from an ON pixel to an OFF pixel. Whenever the scan reaches a transition from an ON pixel to an OFF pixel, if the ON pixel is already labeled, the scan can continue across OFF pixels to the next transition, but if the ON pixel is not already labeled, it can be labeled with the current label value and the scan can follow the boundary through it, labeling ON pixels with the current label value. In this way, each pixel in a connected component is labeled with a unique identifier for the connected component.

The spread operation performs a first pass over the labeled version of the first data image and a second data image, to obtain a first pass value for each component's identifier in the labeled version of the first data image. The first pass value can be obtained using an appropriate combining function, such as addition, maximization, minimization, OR, AND, XOR, and so forth for all pixels in the second data image that have the same component identifier in the labeled version. For an operation that counts pixels, for example, the combining operation can be addition, performed on a binary image. In obtaining data image 242, the second data image is the intersection of the complement data image and the border data image, and the combining function is maximization, so that each component identifier's first pass value is ON if its connected component includes an ON pixel in the intersection and OFF if not.

The spread operation then performs a second pass over the labeled version of the first data image to produce a resulting data image. In obtaining data image 242, the resulting data image is called an exterior data image. The second pass labels each pixel that has a component identifier in the labeled version with the component identifier's first pass value. In obtaining data image 242, the exterior data image has pixels that are ON in those connected components in the complement that include ON pixels in the intersection.

The exterior data image can be used to obtain an externals data image defining an image showing black regions adjacent to the connected components in the exterior data image. First, the complement of the exterior data image can be obtained and used to obtain an exterior edges data image showing each pixel in data image 240 that is next to a pixel that is ON in the exterior. The exterior edges data image can be obtained by obtaining four partial edge data images, each obtained by shifting data image 240 one pixel and then performing a set difference operation to obtain a data image in which each black pixel that has a neighboring white pixel in the direction opposite that of the shift is ON. A set difference operation performs an intersection between a first data image and the complement of a second data image, which has the effect of removing any connected component in the second data image from the first data image. The union of the four partial edge data images, referred to as an edges data image, can then be intersected with data image 240 to obtain an exterior edges data image in which a pixel is ON if it is ON in data image 240 and is adjacent to a connected component in the exterior data image. The externals data image can then be obtained by obtaining the black connected components in the original image that include black pixels in the exterior edges data image, using a coloring operation similar to the one described above.

Finally, the internals data image can be obtained by performing a set difference operation on data image 240 and the externals data image.

The internals data image can then be used to obtain an internal-free version of data image 240 in which the internal connected components are removed. This can be done by performing a set difference on data image 240 and the internals data image.

Data image 242 can then be obtained using the internal-free version of data image 240.

Using operations like those described above, an internals data image can be obtained for the internal-free version. Also, a filled data image can be obtained for the internal-free version by taking the complement of its exterior data image. An enclosure data image can then be obtained by a coloring operation that obtains the black connected components in the filled data image that include black pixels in the internals data image.

Also, a holes data image can be obtained for the internal-free version by taking the set difference between the filled data image and the internal-free version. Each pixel in the holes data image is ON if it is in a white region of the internal-free version and the white region is enclosed by black regions.

A coloring operation as described above can be performed to obtain the black connected components in the filled data image that include black pixels in the holes data image. A set difference between the result and the enclosure data image can then be obtained, and the intersection of the result with the internal-free version produces data image 242. Therefore, in data image 242, each pixel is ON if it is in a connected component in data image 240 and if the connected component is not enclosed by any other connected component but itself encloses at least some white area. Connected components that meet this criterion, called a boundary criterion, can be called boundary connected components. As mentioned below, for some applications, a constraint on nodes can be satisfied by a connected component that meets the boundary criterion.

Data image 242 can then be used to obtain data image 244, in which each pixel in a boundary connected component in data image 242 is labeled with the area of the boundary connected component. A spread operation can obtain data image 244. In the spread operation, data image 242 is the first data image, each of whose connected components have a unique identifier in the labeled version, and data image 242 is also the second data image, on whose pixel values a combining function is performed during the first pass. In obtaining data image 244, the combining function is addition, producing a count of ON pixels equal to each connected component's area as the connected component's first pass value. In data image 244, each pixel in a connected component in data image 242 is thus labeled with the connected component's area.

In data image 246 each pixel in a boundary connected component in data image 242 is labeled with the area enclosed by the boundary connected component, referred to herein as the hole area. To label pixels with hole area, data image 242 can be used to obtain a holes data image, using operations as described above; in the holes data image, each pixel within the enclosed white area of a boundary connected component is ON. Data image 242 can also be used to obtain a filled data image, using operations as described above; in the filled data image, each pixel that is either in a boundary connected component or within the enclosed white area of a boundary connected component is ON. Then a spread operation can be performed, counting the ON pixels in the holes data image that are within each connected component in the filled data image in the first pass and relabeling each pixel with the count for its connected component in the second pass. Finally, data image 246 can be obtained by keeping the relabeled count for each pixel that is in a boundary connected component in data image 242.

Data image 250 indicates pixels that are in connected components that satisfy a constraint on nodes that is used in some applications. To satisfy the constraint, a part of an image must meet a node criterion requiring a connected component that encloses more hole area than the area of the connected component. Data image 250 can be obtained using data images 244 and 246. Each pixel in data image 244 is compared with the counterpart pixel in data image 246 to determine whether the pixel in data image 244 has a greater value than the pixel in data image 246. If so, the connected component that includes the pixel has less area than the hole area it encloses, so that the pixel is ON in image 250. As a result, each pixel in data image 250 is ON if it is in a connected component that meets the node criterion.

Data image 252 indicates pixels that are in connected components that could possibly be directed links because they meet one criterion that is part of a constraint on directed links. The directed link constraint applied in FIG. 7 includes a head criterion and a tail criterion. Data image 252 is obtained by applying only the head criterion, and data image 254 is obtained by applying the tail criterion to data image 252. Therefore, data image 254 indicates pixels that are in connected components that satisfy the constraint on directed links.

The head criterion requires a connected component that encloses a white area smaller than its own area. Data image 252 can be obtained similarly to data image 250, except that the comparison is reversed so that a pixel is ON if its connected component has a greater area than the hole area it encloses.

The tail criterion applied in FIG. 7 requires additional information about each connected component that meets the head criterion. Among other things, the tail criterion requires that a connected component have at least one part that meets a termination criterion. Data image 254 therefore indicates pixels, each of which is in a connected component with a greater area than the hole area it encloses, with at least one part that meets the termination criterion, and that meets additional requirements of the tail criterion. Such connected components satisfy a constraint on directed links.

The termination criterion can be applied by obtaining a termination count data image in which each pixel in a connected component is labeled with a count of its terminations. The termination count data image can then be used to obtain a terminated link data image by comparing each pixel's label with the value one, with the result being ON if the pixel's label is at least one. The terminated link data image shows each connected component that is a possible link and that has at least one termination.

The termination count data image can be obtained from data image 252 by first handling each connected component in data image 252 separately, to avoid interactions between connected components that are near each other. For each connected component, a data image showing only the connected component is obtained and used to obtain a terminations data image. This can be done by obtaining a labeled version of data image 252 in which each connected component is labeled with a unique identifier, and then obtaining a version in which pixels having one of the unique identifiers are ON.

Each connected component's data image can then be used to obtain an exit count data image in which each pixel's value indicates the number of connected components intersecting with the border of a square local region of a given width w, with the location being at the upper left corner of the local region. The exit count data image can then be used to obtain a branching factor data image, which can in turn be used to obtain the termination count data image.

In obtaining the exit count data image, the width w should be set large enough to capture the branching of curves of typical width in a data image. If the connected components are of uniform width and if a skeleton for a connected component is obtained, as described below, an appropriate width could be four times the most frequently occurring distance from points on the skeleton to the nearest edge, approximately twice the width of the connected component.

In obtaining the exit count data image given any binary data image, four edge data images are first obtained, each one with black pixels labeled that have a white neighbor in one of the four directions +x, −x, +y, and −y; the edge data images can be obtained by shifting the binary data image by one pixel in each direction and then performing a set difference with each shifted version.

Each edge data image can then be used to obtain a respective border count data image, and the border count data images can be combined to obtain a border edge total data image.

To obtain the edge sum data image for the +x edge data image, for example, a project operation can first be performed in the −x direction to obtain a +x project data image in which each pixel is labeled with a sum of the pixel values to its right in the +x edge data image.

In general, a project operation in a given direction obtains a value for each pixel based on the value obtained for an adjacent pixel in the direction in which the operation is being performed, referred to as a previous pixel. A project operation can thus be used to copy a pixel's value to a series of pixels in a given direction or to obtain the sum, the maximum, or the minimum of the values of a series of pixels that extend in a given direction. The project operation that obtains the +x project data image cumulatively adds each pixel's value to the previous pixel's value.

The +x project data image can be translated by a width w in the −x direction and the translated value at each pixel can be subtracted from the pixel's value in the +x project data image to obtain an interval count data image. The edge difference data image can then be adjusted to indicate, at each pixel, a count of +x edges in a border that includes the pixel and extends from the pixel a length w in the +x direction. The adjustment can be made by translating the +x edge data image by a width (w−1) in the −x direction and by then subtracting the translated value at each pixel from the pixel's value in the interval count data image to obtain a +x border edge count data image.

Similar operations can be performed using the −x, +y, and −y edge data images to obtain −x, +y, and −y border edge count data images. For the −x edge data image, the project operation is performed in the −x direction, while the project operation is performed in the −y direction for the +y and −y edge data images. The −x project data image is translated by a width w in the −x direction in obtaining the respective interval count data image, while the +y and −y project data images are each translated by a width w in the −y direction. For the −x edge data image, the adjustment is made by subtracting the pixel's value in the −x edge data image without translation; for the +y edge data image, the adjustment is made by translating the +y edge data image by (w−1) in the −y direction and then subtracting the translated value; and for the −y edge data image, the adjustment is made by subtracting the pixel's value in the −y edge data image without translation.

When all four border edge count data images have been obtained, the +x and −x border edge count data images can be translated (w−1) in the −y direction and the +y and −y border edge count data images can be translated (w−1) in the −x direction. Then the four translated values at each pixel can be added to the four values from the border edge count data images to obtain the border edge total data image. The border edge total data image thus indicates, for each pixel, the total number of edges in the border of a w by w region with the pixel at its upper left corner.

A similar technique can be used to obtain a local region sum data image. A project operation in the −x direction can be performed on a binary data image to obtain a first project data image. The first project data image can be translated by w in the −x direction and the translated value can be subtracted from each pixel's value in the first project data image to obtain an interval sum data image indicating the number of ON pixels in a row that begins with the pixel and extends w in the −x direction. Then a project operation in the −y direction can be performed on the interval sum data image to obtain a second project data image. The second project data image can be translated by w in the −y direction and the translated value can be subtracted from each pixel's value in the second project data image to obtain a local region sum data image indicating the number of ON pixels in a w by w region with the pixel at its upper left corner.

The values in the border edge total data image and the local region sum data image can be used to compute exit counts. If a pixel's value in the border edge total data image is zero and its value in the local region sum data image is greater than zero, the pixel's exit count can be six to indicate a non-empty region with no border exits. Otherwise, if its value in the border edge total data image is less than ten, its exit count can be half its value in the border edge total data image, indicating the number of connected component intersections with the region border. Otherwise, its exit count can be five, indicating more than four connected component intersections with the region border.

An exit count data image can be used to obtain a branching factor data image using a voting computation. The voting computation can begin by obtaining, for each pixel and for each exit count value that occurs in the exit count data image, a current vote count that is a count of the number of occurrences of the exit count value in the pixel's region of width w. As the exit count value is incremented from one through six, if the current vote for an exit count value is greater than a previous highest vote, then the current vote becomes the new highest vote, and the winning exit count value becomes the current value.

The current vote for each exit count value can be obtained as described above in relation to the local region sum data image. The local region sum data image can be obtained from a current exit count data image, in which each pixel is ON only if its value in the exit count data image is equal to the exit count value for which the current vote is being obtained.

A branching factor data image can be obtained by translating the final winning values rightward w/2 and downward w/2.

The terminations data image can then be obtained by making each pixel ON that has a value of one in the branching factor data image for each connected component, then ANDing the results with the image. Therefore, in the terminations data image, each termination of each connected component is marked by a small connected component.

The operations that obtain the branching factor data image depend on an appropriate choice of w, as briefly discussed above. If all connected components are of the same constant width, the mode of curve width can be obtained, and w could be set to a somewhat larger value than the mode. But curves of varying widths require a different approach.

Thinning can be used to canonicalize curves of varying widths so that a branching factor data image can be obtained by operating on a thinned data image. The term "thinning" is used here to refer to any technique that obtains a version of a data image in which pixels along an approximate center line of a connected component are ON. Such techniques are variously described as obtaining spines, skeletons, ridges, local symmetries of distance with or without orientation, symmetric axis transforms, or Voronoi tessellations.

One thinning technique has been used that relies on an operation in which each pixel reads values from a near neighbor, which is possible if each pixel is labeled with x and y offsets to a near neighbor connected component, as discussed below. This thinning technique is based on the insight that pixels along a skeleton of a connected component in an image have neighboring pixels with different near neighbor edge directions in the complement of the image.

Prior to the read operations, the complement of the image, called a ground data image, is used to obtain horizontal and vertical ground data images. Preliminary horizontal and vertical data images are obtained by first obtaining +x, −x, +y, and −y edge data images as described above. Each pixel's value in the preliminary horizontal data image can be a combination of its values in the −x edge and +x edge data images. Similarly, each pixel's value in the preliminary vertical data image can be a combination of its value in the −y edge and +y edge data images. The purpose of combining values in this way is to suppress spurious skeleton points arising from adjacent points on a boundary with distinct edge directions.

Two differences data images can then be obtained, one for each of the preliminary horizontal and vertical data images. Each pixel's value in a differences data image is ON if it has a four-connected neighboring pixel with a different non-zero value. Therefore, each differences data image can be a union of four directed differences data images, and each directed differences data image can be obtained by reading each pixel's neighboring pixel in the respective direction and, if the neighboring pixel has a non-zero value, subtracting the neighboring pixel's value from the pixel's value and obtaining the absolute value of the difference.

The horizontal data image can have an ON value for each pixel that is ON in the preliminary horizontal data image and OFF in the horizontal differences data image. Similarly, the vertical data image can have an ON value for each pixel that is ON in the preliminary vertical data image and OFF in the vertical differences data image.

Two read operations can be performed, a horizontal read and a vertical read. Each read operation uses the x and y offsets to a near neighbor in the ground data image to read the value near neighbor's value in the horizontal or vertical data image.

Finally, a skeleton data image is obtained using the results of the horizontal and vertical read operations. In each case, a differences data image is obtained as described above, and the union of the two differences data images is the skeleton data image.

The x and y offsets to a neat neighbor can be obtained in various ways. Borgefors, G., "Distance Transformations in Digital Images," *Computer Vision, Graphics, and Image Processing*, Vol. 34, 1986, pp. 344–371, describes distance transform techniques that could be used to obtain x and y offsets, a distance magnitude, a direction, or other information about the near neighbor. Another technique would perform a variation on the two-pass technique described in the Borgefors article. Each pass would obtain, for each pixel, an approximate whole distance to a near neighbor. Each pass would also store, for each pixel, two bits indicating which of the previously scanned pixels that is eight-connected to the pixel has the nearer near neighbor. An appropriate increment could be added to the near neighbor distance of the previously scanned pixel with the nearer near neighbor to obtain a pixel's near neighbor distance. The second pass would also include setting a bit for each pixel to indicate which of the two passes obtained a nearer near neighbor. As a result, the information necessary to obtain a near neighbor distance for any pixel could be stored in five bits per pixel, and the approximate whole distances could then be discarded. The stored information, consisting of five bits per pixel, could then be used in a single pass operation to obtain the x and y offsets, a distance magnitude, a direction, or other information about the near neighbor when needed or in a single pass read operation to transfer data from a pixel to each pixel for which it is the near neighbor.

The terminations data image can be used to obtain a termination count data image by first obtaining a shrink data image in which each connected component in the terminations data image is replaced by a single ON pixel.

A spread operation can then be performed on the result to obtain the sum of the terminations in each connected component and to label each pixel in the connected component with the sum.

The shrink data image can be obtained by first performing a spread operation on the terminations data image to label each connected component with its minimum y coordinate. The minimum y data image can then be compared with each pixel's y coordinate to obtain a data image in which a pixel is ON if it has the minimum y coordinate of its connected component. This data image can be ANDed with the terminations data image to obtain a top data image. The top data image can be used to gate each pixel's x coordinate, and a spread operation can be performed using the gated data image to label each pixel in a connected component in the terminations data image with the minimum value its pixels have in the gated data image. The resulting value of each pixel can then be compared with its x coordinate to obtain a data image in which a pixel is ON if it has the minimum x coordinate of its connected component. Finally, this data image is ANDed with the top data image to obtain the shrink data image.

When the terminated link data image has been obtained as described above, a tail criterion can be applied to it to obtain data image 254. To apply the tail criterion, a possible heads data image can first be obtained from the terminated link data image. Then, the possible heads can be removed from the terminated link data image to leave a possible tails data image. A first spread operation can be performed using the possible tails data image to obtain an possible tail areas data image in which each pixel in a possible tail is labeled with the area of the possible tail, as described above. A second spread operation can be performed to label each pixel in each connected component in the terminated link data image with the maximum of the possible tail areas for the connected component. The two labeled data images can then be compared to obtain a longest possible tails data image in which each pixel is ON if its possible tail area is equal to the maximum for its connected component. The longest possible tails data image can then be ANDed with the possible tail areas data image to obtain a tails data image. A coloring operation can then be performed using the tails data image and data image 240 to obtain data image 254, showing the connected components in data image 240 that meet the directed link criterion.

A possible heads data image can be obtained that shows portions of connected components in the terminated link data image that enclose areas. For example, a holes data image could be obtained from the terminated link data image as described above and then connected components in the holes data image could be grown by twice the mode of local width. The result could be ANDed with the terminated link data image to keep only those parts of connected components that enclose areas. A boundaries data image could be obtained as described above to serve as the possible heads data image.

A local width data image could be obtained by first using the terminated link data image to obtain a skeleton data image as described above in relation to thinning. The local width data image can be obtained from the skeleton data image by obtaining, for each ON pixel in the skeleton data image, twice the distance to a near neighbor in the complement of the terminated link data image. The distance to the near neighbor could be obtained as described above in relation to x and y offsets. The local width data image can then be scanned to obtain a mode of the local width.

A holes data image as described above can also be obtained using the terminated link data image. Then, an operation with twice as many iterations as the mode of the local width can be performed using the holes data image to obtain a grow data image. Each iteration can obtain the union of its starting data image with the edges data image of the complement of the starting data image, obtained as described above, so that each black component of the starting data image is extended outward by one pixel in four directions. As a result, holes in the terminated link data image are grown outward so that they cover the parts of connected components that enclose them.

The grow data image can then be ANDed with the terminated link data image to obtain a data image that includes the parts of connected components that enclose white areas in the terminated link data image. A boundaries data image, as described above, can be obtained for the result. Each connected component in the boundaries data image is a possible head.

An alternative technique can also be used to obtain a possible heads data image. A distance transform can be obtained for the holes data image, and the distance transform could be thresholded by line width to obtain a single line width around each hole to serve as the possible heads data image.

FIG. 7 also shows other data images that include parts that satisfy other constraints on nodes or links.

Data image 256, for example, indicates pixels in connected components that satisfy a constraint on undirected links. This constraint includes an open curve criterion and a two termination criterion. In other words, a connected component satisfies this constraint if it is an open curve with exactly two terminations.

As shown, data image 256 can be obtained from data images 240 and 242. Data image 242 can be used to obtain a filled data image, as described above, and the filled data image can be removed from data image 240 to eliminate any connected component that encloses OFF pixels. The resulting data image indicates pixels in connected components that satisfy the open curve criterion. Then, the open curves data image can be used to obtain a termination count data image as described above, and the two termination criterion can be applied by comparing each pixels termination count with two, so that each pixel's value in data image 256 is ON only if its termination count is two.

Data image 260 is an original image that can be edited by an application in which human-produced data image 240 shows an overlay with editing marks that form node-link structures in which features in data image 260 are nodes.

Therefore, all of the pixels indicated by data image 260 can satisfy a constraint on nodes.

Data image 262 indicates pixels that satisfy another constraint on nodes that is appropriate in an editing application. This constraint permits an editing mark in the shape of an "X," which is useful to indicate a request for deletion. The constraint includes a cross criterion, which can be applied by first applying the open curve criterion described above to obtain an open curves data image, and by then applying a cavity count criterion to the open curves data image to obtain data image 262.

The cavity count criterion can require that a connected component in the open curves data image includes exactly four cavities, so that a pixel is ON in data image 262 only if it is in a connected component that is an open curve with four cavities. The cavity count criterion can be applied by first obtaining a cavities image showing the union of all two-way, three-way, and four-way cavities in the open curves data image, by shrinking each connected component in the cavities data image to a single pixel, and by using a spread operation on the shrunken cavities data image to count the number of cavities in each connected component in the open curves data image.

The two-way cavities include top-right, bottom-right, top-left, and bottom-left cavities. For each type of two-way cavity, the value of a pixel can be determined from the values of its four-connected neighbors by shifting the data image and performing logical operations. The top-right cavity value, for example, is ON if the pixel's neighbor in the −x direction has a non-zero value; if the pixel's neighbor in the −x direction has the same value as the pixel's neighbor in the +y direction; and if the pixel's neighbor in the −x direction has a different value than the pixel's neighbors in the −y and +x directions. The other two-way cavity values can be similarly obtained.

The three-way cavities include top, bottom, left, and right cavities. For each type of three-way cavity, the value of a pixel can be determined from the values of its four-connected neighbors by shifting the data image and performing logical operations. The top cavity value, for example, is ON if the pixel's neighbor in the −x direction has a non-zero value; if the pixel's neighbor in the −x direction has the same value as the pixel's neighbors in the +x and +y directions; and if the pixel's neighbor in the −x direction has a different value than the pixel's neighbor in the −y direction. The other three-way cavity values can be similarly obtained.

The four-way cavity value of a pixel can similarly be determined from the values of its four-connected neighbors by shifting the data image and performing logical operations. The four-way cavity value is ON if the pixel's neighbor in the +y direction has a non-zero value and if the pixel's neighbor in the +y direction has the same value as the pixel's neighbors in each of the other directions.

A data image indicating parts of an input image set that satisfy a constraint on nodes or a constraint on links can be obtained using data images from FIG. 7. For example, in a simple directed graph analysis application, data image 250 can indicate parts that satisfy a constraint on nodes and data image 254 can indicate parts that satisfy a constraint on directed links. In an editing application, on the other hand, data images 242 and 260 can be ORed to obtain one set of parts that satisfy a constraint on directed graph nodes and data image 254 can indicate parts that satisfy a constraint on directed links, while data images 252, 260, and 262 can be ORed to obtain another set of parts that satisfy a constraint on undirected graph nodes and data image 256 can indicate parts that satisfy a constraint on undirected links.

FIG. 8 shows acts in obtaining data images that include subsets of likely nodes and links that satisfy a constraint on node-link structures.

The act in box 280 receives data images indicating parts of an input image set that satisfy a constraint on nodes, referred to as likely nodes, and parts that satisfy a constraint on links, referred to as likely links. The act in box 282 begins an iterative loop. In the first iteration, the act in box 282 sets the data images received in box 280 to be the previous nodes and previous links. Then, the act in box 284 uses the previous nodes and previous links from box 282 to obtain new nodes and new links.

The act in box 290 compares the previous nodes and links with the new nodes and links. If there is a change, the act in box 282 begins another iteration by setting the new nodes and links from the previous iteration as the previous nodes and links. If there is no change, the act in box 292 returns the new nodes and links, which form a node-link structure.

The act in box 284 applies nearness criteria to obtain subsets of the previous nodes and links as new nodes and links. FIG. 9 shows how a node nearness criterion can be applied to obtain new nodes that are a subset of previous nodes. FIG. 10 shows how a link nearness criterion can be applied to obtain new links that are a subset of previous links.

Data image 310 in FIG. 9 shows previous nodes. The previous nodes could be likely nodes from box 280 in FIG. 8 or could be new nodes obtained in box 284 in a preceding iteration in FIG. 8. Similarly, data image 312 shows previous links that could be links from box 280 in FIG. 8 or could be new links obtained in box 284 in a preceding iteration in FIG. 8.

Data image 312 can be used to obtain data images 320 and 322. In terminations data image 320, each pixel in a connected component in data image 312 is ON if its branching factor is one, as described above in relation to data image 254 in FIG. 7. To obtain data image 322, a data image showing parts that meet a tail criterion can be obtained from data image 312 as described above in relation to data image 254, and a set difference can be performed to remove pixels in parts that meet the tail criterion from each connected component in data image 312, leaving data image 322 showing non-tail connected components.

Data images 320 and 322 can be ORed to obtain extremities data image 324, in which each pixel is ON if it is ON in one or both of data images 320 and 322. A set difference can be performed to remove pixels that are ON in data image 324 from data image 322, leaving data image 326 in which each connected component is a non-head extremity.

Data images 310 and 322 can be used to obtain data image 330, in which each connected component is a node that is a nearest neighbor of a non-tail, or head, connected component in data image 322. Similarly, data images 310 and 326 can be used to obtain data image 332, in which each connected component is a node that is a nearest neighbor of non-head connected component in data image 326.

In obtaining data images 330 and 332, an intercomponent distances data image can be obtained using data image 310. First, handling each connected component in data image 310 in isolation, an other component version of data image 310 can be obtained by removing the connected component; a distances data image can be obtained, using techniques described above in relation to data image 254 in FIG. 7, so that the distances data image indicates distances from each pixel to a near connected component in the other component version. The distances data images for the connected components can be combined to obtain the intercomponent distances data image by retaining, at each pixel in a connected component, the value from connected component's distances data image.

A spread operation as described above can label the pixels of each connected component in data image 310 with the minimum distance from the intercomponent distances data image for pixels in the connected component. The resulting data image can then be compared with the intercomponent distances data image, and each pixel for which the distances in the two data images are the same can be ON in a combined data image. The combined data image can then be ANDed with data image 322 or data image 326 to obtain a closest points data image in which each pixel is ON if it is a pixel that, among the pixels in a connected component in data image 322 or data image 326, is at the closest distance from a near neighbor connected component in data image 310.

Offsets in the x and y directions to the nearest connected component in data image 322 or data image 326 can then be obtained for each ON pixel in the closest points data image by operations similar to those described above for distances data images. The x and y offsets can then be used in write operations to transfer values in the closest points data image to near neighbors in data images 322 and 326, retaining the maximum value where collisions occur. Coloring operations can then color each pixel in a connected component in data image 310 with the value ON if the connected component includes any non-zero pixels after the write operations, producing data images 330 and 332.

Data images 330 and 332 can then be ORed to obtain data image 334, in which each pixel is ON if it is in a connected component in data image 310 and the connected component is the nearest neighbor of a head or of a non-head extremity of a link. In other words, the node nearness criterion keeps a previous node if it is the nearest neighbor of a head or of a non-head extremity of a previous link.

Data images 350 and 352 in FIG. 10 show previous nodes and links as in data images 310 and 312 in FIG. 9. Data image 360 can be obtained from data image 352 in the same manner as data image 324 in FIG. 9.

Data image 352 can also be used to obtain data image 362, in which each pixel in a connected component in data image 352 is labeled with a value indicating an approximate length of the connected component. Data image 352 can first be used to obtain an edges data image as described above. A spread operation as described above can then be performed to obtain the sum of the edge pixels in each connected component in data image 352 and to then label each pixel in each connected component with the sum, thus obtaining a perimeter data image. To approximate the length, each pixel's perimeter can be divided by two, and the result rounded to an integer, thus obtaining data image 362.

Data images 350 and 360 can be used to obtain data image 364, in which each pixel in a connected component in data image 360 is labeled with a minimum distance to a node. An intercomponent distances data image can be obtained using data image 350 as described above. A spread operation as described above can then be performed to obtain the minimum distance from the intercomponent distances data image for each connected component in data image 360 and to then label each pixel in the connected component with the minimum distance.

Data images 352 and 364 can then be used to obtain data image 370, in which each pixel in a connected component in data image 352 is labeled with a maximum distance to a node. A spread operation as described above can be performed to obtain the maximum distance in data image 364 within each connected component in data image 352 and to then label each pixel in the connected component with the maximum distance.

Finally, data images 362 and 370 can be used to obtain data image 372, in which each pixel in a connected component in data image 352 is ON if its approximate length in data image 362 is greater than its maximum distance in data image 370. In other words, the link nearness criterion keeps a previous link if the link's approximate length is greater than the maximum distance from one of its extremities to the nearest previous node.

After a final iteration, data images 334 and 372 could be returned in box 292 in FIG. 8, or data images 334 and 372 could be used to obtain other data indicating nodes and links. As discussed below in relation to a rendering application, for example, lists of nodes and links could be obtained and returned.

3. Variations

The implementations described above use particular operations described above to obtain likely node-link data and constrained node-link data from an image showing a node-link structure. Numerous other combinations of operations besides those described above could be used to obtain likely node-link data and constrained node-link data.

The implementations described above use specific criteria for nodes, links, node nearness, and link nearness to determine whether parts of images satisfy constraints on nodes, links, and node-link structures, but other techniques could be used to obtain likely node-link data indicating likely nodes and likely links and constrained node-link data indicating subsets of the likely nodes and links that form a node-link structure. For example, the directed link criterion described above requires that a link include an enclosed area; instead, the directed link criterion could require a cavity at one end, allowing a directed link to be drawn as an arrow; or the directed link criterion could require one end of a link to have a disconnected blob, a connected blob, a crossing, a disconnected line, and so forth, allowing a directed link to be drawn in various other ways; or the directed link criterion could simply require a link to extend in a specific direction from a node, such that the head is, for example, lower or to the right of the tail.

The implementations described above apply constraints on nodes, links, and node-link structures to distinguish nodes and links from labels. Other criteria could be employed, and additional constraints could be applied to distinguish other features that may occur in a node-link structure.

The implementations described above facilitate analysis of a sketch of a node-link structure by applying criteria that a human can easily follow in producing a sketch. To analyze other types of node-link structures, appropriate criteria can be chosen.

The implementations described above ignore labels and other parts of an image set that do not form a node-link structure, but could be extended to extract labels and other image parts so that they could be handled in an appropriate way. Labels could be cut and pasted into an output image. Or labels could be recognized using optical character recognition (OCR), and data indicating characters in the labels could be returned. Label criteria could be used to obtain data indicating parts of an image set that satisfy a constraint on labels: A general label criterion could require any label to be a proximity group of characters or to have a specific maximum size; a node label criterion could require a node label to be inside an enclosed area of a node or to be closer to its node than to any other node or edge, although this might require modifications in the link criterion; and a link label criterion could require a link label to be nearer to a link than it is to any node, and could also require that every edge have a label to disambiguate labels that could otherwise be interpreted as nodes or links.

The implementations described above, as described above, handle certain operations in a component-serial fashion, obtaining terminations or distances for each connected component separately and then combining the results. Most other operations are handled in component-parallel fashion. The mix of component-serial and component-parallel operations could be varied in any appropriate way; all operations could be component-parallel, all could be component-serial, or some could be component-parallel and others component-serial. In addition, rather than performing constraint propagation on likely nodes and likely links in data images, coordinates or other symbolic descriptions of likely nodes and likely links could be used to perform constraint propagation in a more symbolic manner.

The implementations described above use currently available image processing techniques, but could readily be modified to use newly discovered image processing techniques as they become available. For example, component-parallel techniques for obtaining terminations and distances between connected components might be used instead of component-serial techniques; the component-parallel techniques might use Voronoi boundaries or Voronoi regions, for example, spreading minimum distances from locations on a Voronoi boundary.

The implementations described above operate on binary images, but could be extended to operate on color or gray scale images, either directly or after binarization.

The implementations described above use constrained node-link data to obtain a precisely formed version of a node-link structure or to perform editing operations. The constrained node-link data could instead be used to obtain a different graphical representation, such as a table.

The implementations described above use the results of image analysis to control rendering, but image analysis results could be used for a variety of other purposes. For example, the results of image analysis could be stored to preserve a graphical representation generated during a meeting using a tool such as a computer-controlled whiteboard device, for which user interface techniques are described in copending, coassigned U.S. patent application Ser. Nos. 07/869,554, entitled "Generalized Wiping as a User Interface for Object-Based Graphical Displays," and 07/869,559, "Time-Space Object Containment for Graphical User Interface," both incorporated herein by reference.

The rendering back end of the implementations described above is based on a collection of PostScript code fragment templates, made interactively using the IDRAW program in the X window system. Parameters of a graphical representation are automatically inserted into a PostScript code fragment template, and data defining an output image with a more precise version of the graphical representation is obtained by invoking a sequence of PostScript code fragments according to the structure of a category that applies to the graphical representation. This approach is compatible with many PostScript-based drawing/rendering programs. To make an interface to a new drawing system, one would simply perform interactive operations to obtain a collection of PostScript code fragment template files.

One of the advantages of the implementations described above is that the user can draw a relatively simple sketch to indicate a relatively complicated graphical representation that can be rendered automatically in response to the sketch. Therefore, the sketch may not specify all the relevant parameters of the output image, making it necessary for parameters that are not specified to default sensibly. In the implementation described above, default parameters are supplied by rendering procedures. A user could instead provide defaults, such as in an initialization file. Defaults could be provided for specific categories and for specific rendering systems.

The implementations described above perform acts in a specific order that could instead be performed in another order.

Figure 11:
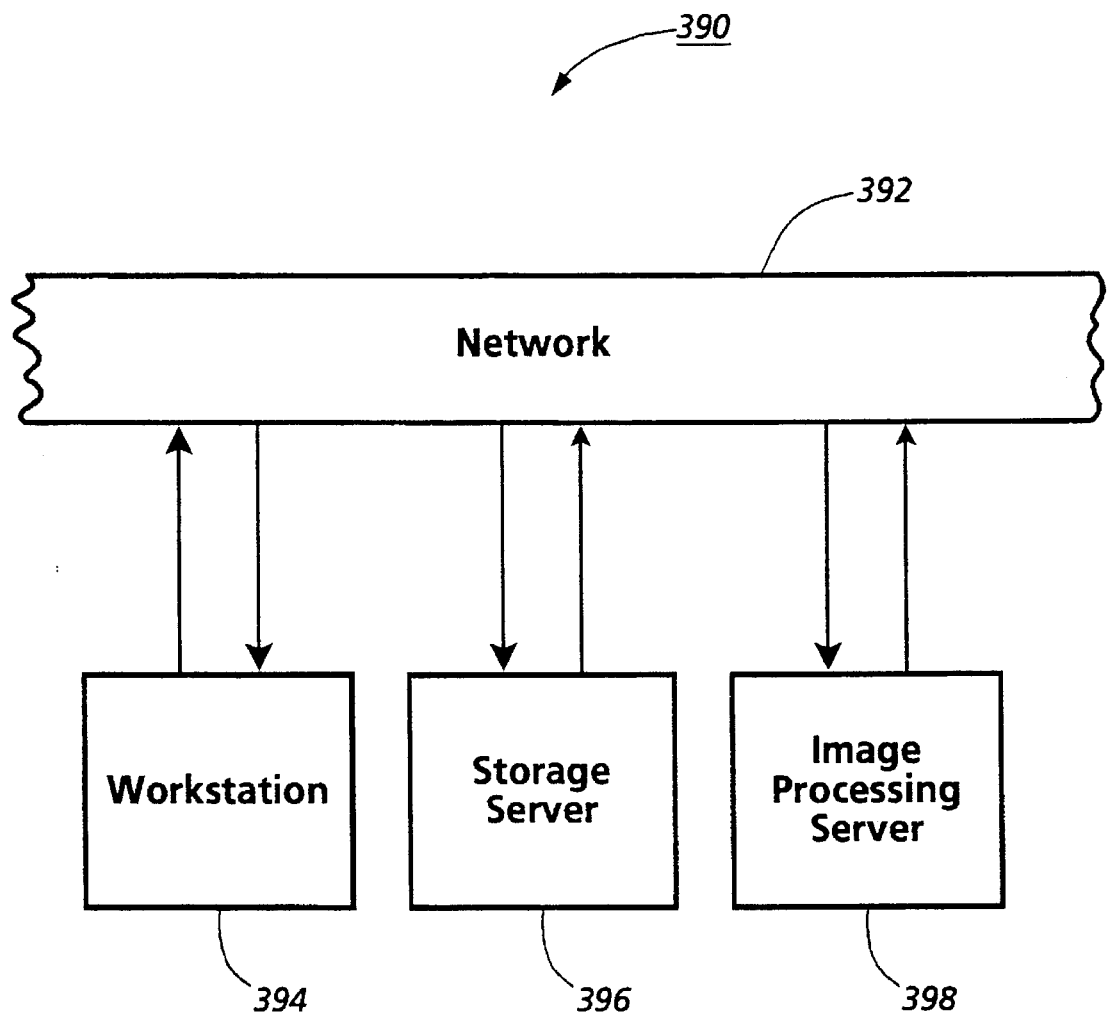
FIG. 11 is a schematic block diagram of an implementation with an image processing server.

The implementation described above in relation to FIG. 6 employs a workstation CPU that executes image processing instructions. FIG. 11 shows an alternative implementation that uses an image processing server. This implementation can provide the usual advantages of server architectures, including economy, speed, and sharing of resources.

System 390 in FIG. 11 includes network 392, workstation 394, storage server 396, and image processing server 398. A user can operate workstation 394 to provide requests on network 392 for storage of data defining images, such as from a scanner or other source. In response, storage server 396 can store the data. Then, the user can operate workstation 394 to provide requests for image processing operations like those described above. In response, image processing server 388 can perform the requested operations, executing instructions like those described above in relation to FIG. 6.

D. Application

The invention could be applied in many ways in a wide variety of machines. As noted above, the constrained node-link data indicating nodes and links that form a node-link structure could be stored for comparison with other images or could be used to provide control signals through conventional techniques. In addition, one implementation includes a rendering application and an editing application. The rendering application obtains an image showing a node-link structure that resembles the analyzed node-link structure. The editing application analyzes node-link structures to obtain data indicating editing operations.

FIG. 12 shows general components of system 400 in which a rendering application can be implemented. System 400 includes processing circuitry 402, in the current implementation a workstation CPU as in FIG. 6. Processing circuitry 402 is connected for receiving data defining images from scanning circuitry 404, which can be a peripheral scanner as in FIG. 6, and for providing data defining images to printing circuitry 406, which can be a peripheral printer as in FIG. 6.

Processing circuitry 402 is also connected for accessing program memory 410 and data memory 412. The instructions stored in program memory 410 can include operating system instructions 420 and image receiving instructions 422, as in FIG. 6. Categorizing and rendering instructions 424 can be implemented as described below in relation to FIG. 13, and can call image processing instructions 426, which can be implemented as described above in relation to image processing instructions 204 in FIG. 6. Categorizing and rendering instructions 424 can also call image printing instructions 428 to provide data defining an image to printing circuitry 406.

Execution of image receiving instructions 422 by processing circuitry 402 results in storage of input image data 430 in data memory 412. Execution of categorizing and rendering instructions 424 then results in the use of input image data 430 to obtain node-link data 432, which is in turn used to obtain output image data 434. Node-link data 432 can include constrained node-link data 212 as in FIG. 6.

Finally, output image data 434 is provided to printing circuitry 406.

As shown, scanning circuitry 404 can operate on sheet 440, which shows a sketch of a node-link structure, to obtain data defining image 440. Execution of image receiving instructions 422 and categorizing and rendering instructions 424 then leads processing circuitry 402 to provide data defining image 442 to printing circuitry 406 for printing. As a result, printed sheet 442 shows a precisely formed node-link structure like the one shown by sheet 440.

The act in box 460 in FIG. 13 begins by receiving data defining an input image showing a node-link structure, which can be a sketch as in FIG. 12. As described in copending, coassigned U.S. patent application Ser. No. 08/158,063, entitled "Using a Category to Analyze an Image Showing a Graphical Representation," incorporated herein by reference, various criteria could be applied to obtain category data indicating a category that includes the node-link structure. As suggested by the dashed line in FIG. 13, some of these criteria could be applied before the act in box 462. The acts in boxes 462 and 470 then obtain category data indicating whether the input image shows a node-link structure.

The act in box 462 can obtain an image of nodes and an image of links that satisfy a constraint on node-link structures, using techniques like those described above in relation to FIGS. 7–10. The act in box 470 can then apply a criterion to the images from box 462 to obtain a binary item of data indicating whether the input image satisfies a constraint on node-link structures; the binary item can indicate, for example, whether the image of nodes includes two or more connected components and the image of links includes one or more connected components. If not, the act in box 472 handles the image as another category or as an unrecognized category.

If the binary item indicates that the input image shows a node-link structure, the act in box 474 renders an output image by loading data into a page description language (PDL) file, such as a PostScript file. The act in box 474 can use the image of nodes and the image of links to obtain data indicating position of a bounding box around the node-link structure, such as by ORing the two images and obtaining a bounding box of the result; data indicating a center and radius of each node; data indicating that a circle should be drawn for each node; data indicating sampled points along each link; and data indicating that each link should be drawn by interpolating a line connecting the sampled points and by putting an arrow on a directed end. The act in box 474 can load this data into the PDL file. Then, the act in box 476 can provide the PDL file to a printer.

The acts in FIG. 13 are an example of the technique described in copending, coassigned U.S. patent application Ser. No. 08/158,063, entitled "Using a Category to Analyze an Image Showing a Graphical Representation," incorporated herein by reference. The acts in boxes 462 and 470 obtain category data indicating a category of graphical representations, in this case node-link structures, and the act in box 474 uses the category data to obtain parameter data indicating parameters of a node-link structure, which can then be printed.

Figure 14:
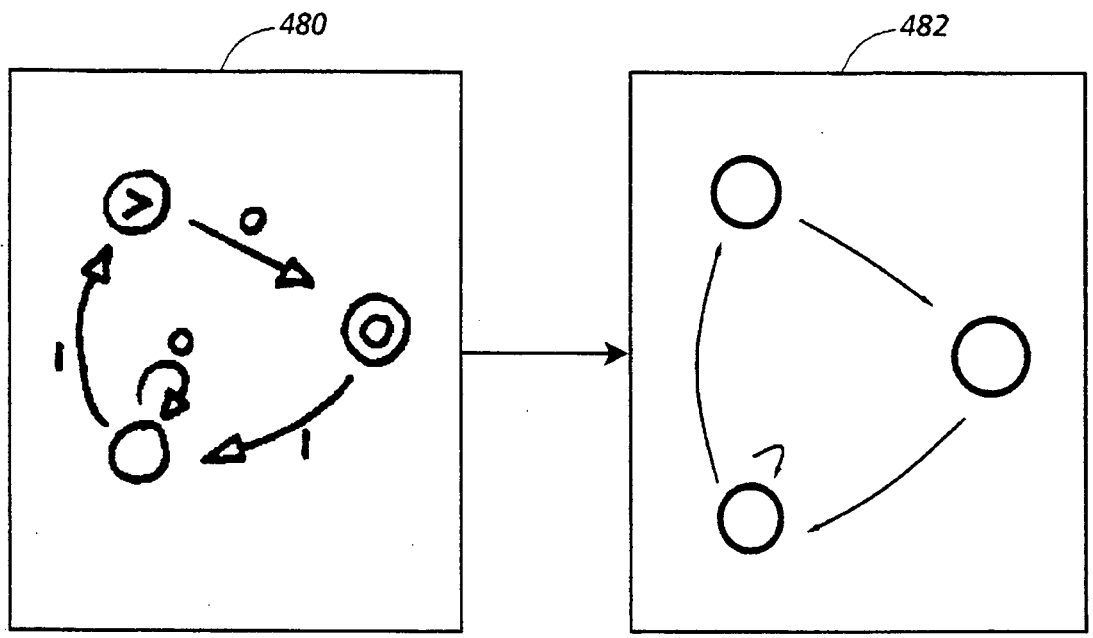
Figure 15:
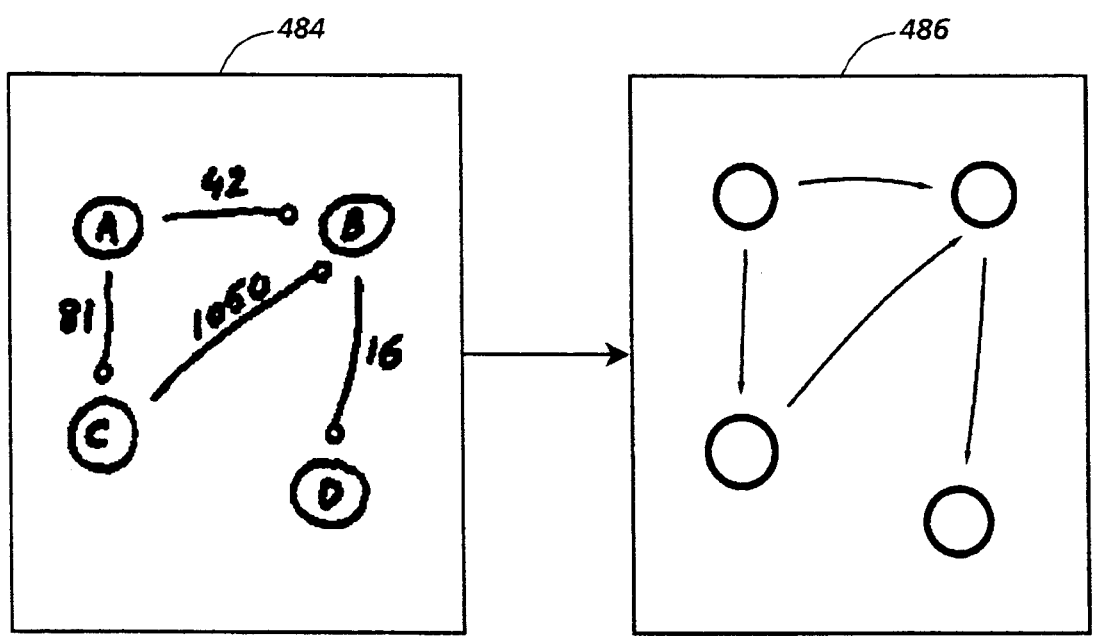
Figure 16:
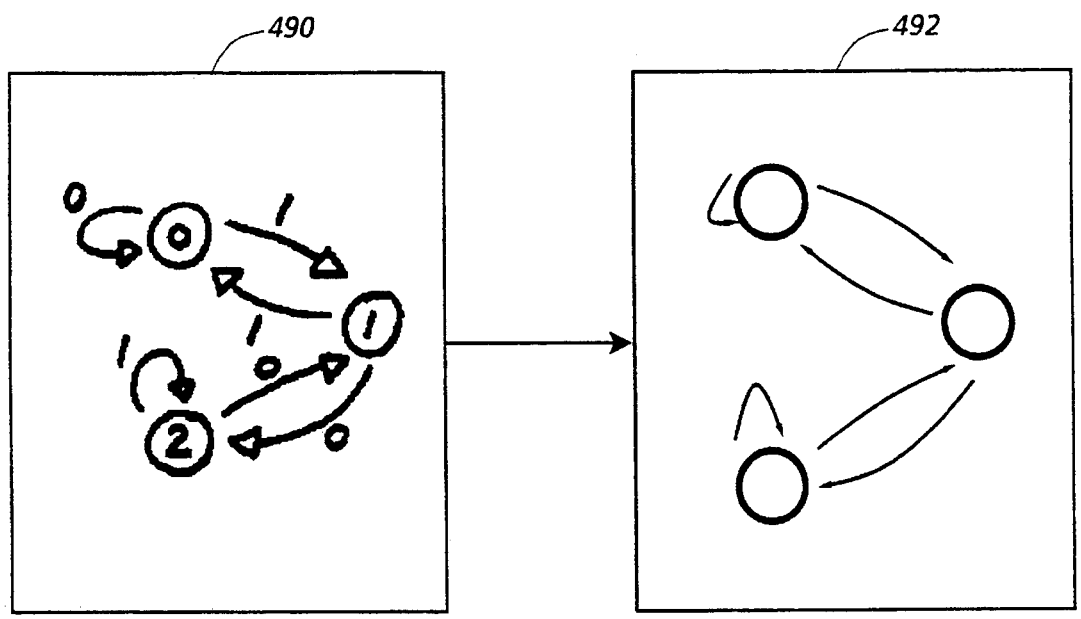
Figure 17:
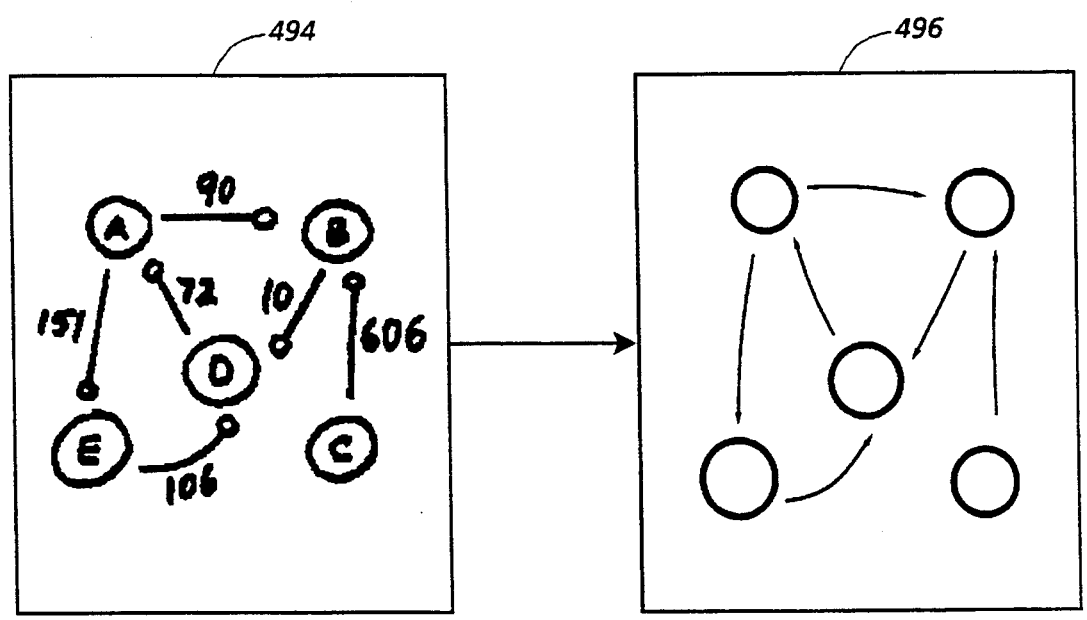

FIGS. 14–17 illustrate results obtained with one implementation. In FIG. 14, image 480 shows a sketch of a directed graph in which the nodes are roughly circular and the links are lines with triangular arrow-like heads; image 482 shows the resulting precisely formed image, with nodes and links related as in image 480 but omitting node and link labels. Similarly, in FIG. 15, image 484 shows a sketch of a directed graph, but with links with round heads; image 486 shows the resulting precisely formed image. In FIG. 16, image 490 shows a sketch of a directed graph, and image 492 shows the resulting precisely formed image. In FIG. 17, image 494 shows a sketch of a directed graph, and image 496 shows the resulting precisely formed image.

The technique illustrated in FIGS. 12–17 can provide a tool for rapidly assembling a nicely-rendered image of a node-link structure based on a hand-drawn sketch. A tool of this type would be useful, for example, for generating slides for a talk or for experimenting with the layout of a poster or an illustration page of a paper. Since the tool can start from a hand-drawn sketch, and does not currently include recognition of characters or numerals, it produces precisely formed images that are qualitatively accurate in content but may be quantitatively inaccurate. Data defining an image produced in this manner could be subsequently edited by the user to turn a qualitatively accurate illustration into a quantitatively accurate one.

Application of the invention to editing is described in copending, coassigned U.S. patent application Ser. No. 08/157,804, entitled "Analyzing an Image Showing Editing Marks to Obtain Category of Editing Operation," incorporated herein by reference and referred to herein as the Editing Application. As explained in the Editing Application, each editing operation can be indicated by a node-link structure that includes a feature in a first image and editing marks in a second image that shows an overlay. The techniques described above can be used to analyze the first and second images. If a node-link structure meets a directed graph criterion, a move operation can be performed; if a node-link structure meets an undirected graph criterion, an in-place operation can be performed.

In FIG. 18, original image 500 shows features 502, 504, 506, 508, and 510. Overlay image 510 shows editing marks 522 through 542, made by a user. Editing marks 522 and 524 request a translate and scale/rotate operation on feature 502. Editing marks 526, 528, and 530 request a replace operation on feature 504. Editing marks 532 and 534 request a delete operation on feature 506. Editing marks 536 and 538 request a scale/rotate operation on feature 508. And editing marks 540 and 542 request a translate operation on feature 510.

Image 550 shows overlay image 510 superimposed on original image 500. Five node-link structures are shown, 552 through 560. Structures 552, 554, and 560 meet a directed graph criterion; therefore, the editing marks in structures 552, 556, and 560 request move operations. Structures 556 and 558 meet an undirected graph criterion; therefore, the editing marks in structures 556 and 558 request in-place operations. Move operations and in-place operations are explained more fully in the Editing Application.

Image 570 is an output image, a version of original image 500 produced in response to the editing marks in overlay image 520. As shown, a translate and scale/rotate operation on feature 502 produced feature 572. A replace operation on feature 504 produced feature 574. Feature 506 has been deleted. A scale/rotate operation on feature 508 produced feature 578. And a translate operation on feature 510 produced feature 580.

The Editing Application explains in greater detail how the technique of FIG. 18 can be implemented.

FIG. 19 shows how the techniques of FIGS. 12–18 could be applied in a personal computer that can operate as a fax server. FIG. 20 illustrates how the techniques of FIGS. 12–18 could be applied in a copier.

System 600 in FIG. 19 includes CPU 602, which can be the CPU of a personal computer such as an IBM PC compatible machine. CPU 602 is connected to receive user input signals from keyboard 604 and mouse 606, and can present images to a user through display 608. CPU 602 is also connected to a number of other peripheral devices, illustratively including disk drive 610, modem 612, scanner 614, and printer 616.

Program memory 620 stores operating system (OS) instructions 622, which can be a version of DOS; user interface instructions 624; fax server instructions 626; categorizing and rendering instructions 628; editing instructions 630; and image processing instructions 632. Fax server instructions 626 can be similar to the PaperWorks™ software product described in copending, coassigned U.S. patent application Ser. No. 08/096,198, entitled "Data Access Based on Human-Produced Images," incorporated herein by reference. Categorizing and rendering instructions 628 can include instructions as described above in relation to FIG. 12. Editing instructions 630 can include instructions as described in the Editing Application. Image processing instructions 632 can include instructions as described above in relation to FIG. 12, and can be called by categorizing and rendering instructions 628 and editing instructions 630 to perform image analysis. Fax server instructions 626, categorizing and rendering instructions 628, editing instructions 630, and image processing instructions 632 could be obtained in the form of a software product stored on a floppy disk, diskette, or CD-ROM, and accessed for storage in program memory 620 by disk drive 610.

Data memory 640 stores input image data 642, likely node-link data 644, constrained node-link data 646, and output image data 648 as described above in relation to FIGS. 6 and 12.

System 600 can obtain input image data 642 defining an image set that shows a node-link structure in many ways: Data defining an image set showing a node-link structure could be produced interactively as described above in relation to FIG. 5, such as by executing user interface instructions 624. Any appropriate user interface techniques could be used, including pen-based techniques. Data defining a previously produced image set showing a node-link structure could be retrieved from a storage medium by disk drive 610. Data defining an image showing a node-link structure could be obtained from scanner 614 as described above in relation to FIG. 4. A user could produce data defining an image showing a node-link structure elsewhere and provide it to system 600 through modem 612, such as by making a facsimile transmission to modem 612.

CPU 602 could execute fax server instructions 626 in response to a request received by facsimile transmission through modem 612. The request could include a form indicating a categorizing and rendering operation or an editing operation and also indicating an output image destination such as a fax machine or printer 616. The request could also include data defining an image showing a node-link structure or could indicate an image previously obtained by system 600.

Fax server instructions 626 could include calls to categorizing and rendering instructions 628 to perform acts like those shown in FIG. 13 if the request indicates a categorizing and rendering operation. Execution of fax server instructions 626 could further provide data defining a rendered image, such as a PDL file as in box 474 in FIG. 13. The data defining the rendered image could be provided to modem 612 for facsimile transmission or to printer 616 for printing.

Fax server instructions 626 could similarly include calls to editing instructions 630 to perform acts like those described in the Editing Application if the request indicates an editing operation. Execution of fax server instructions 626 could further provide data defining an edited output image, which could be provided to modem 612 for facsimile transmission or to printer 616 for printing.

The implementations described above are especially well suited to offline sketch analysis as in FIG. 19 because speed of analysis matters less for offline analysis than it would for online analysis. Also, reliability may matter more for offline analysis than it would for online analysis. As illustrated in FIG. 20, however, the implementations described above may also be applied in online analysis, such as in a copier.

In FIG. 20, copier 660 can be a digital copier or other electronic reprographics system. Scanning circuitry 662 obtains data defining input image set 664 showing a node-link structure. User interface circuitry 670 includes touch sensing device 672, which can be a push button, a heat or pressure sensitive element, a capacitance sensing element, or other device for sensing a touching action. When a user touches device 672, user interface circuitry 670 provides touch data indicating that device 672 has been touched.

Processing circuitry 680 uses the touch data to obtain request data indicating a request for an image analysis operation such as categorizing and rendering or editing. Then, responding to the request, processing circuitry 680 uses data defining input image set 664 to automatically obtain likely node-link data indicating parts of input image set 664 that satisfy a constraint on nodes and parts that satisfy a constraint on links. Processing circuitry 680 then uses the likely node-link data to automatically obtain constrained node-link data indicating subsets of the likely nodes and links that satisfy a constraint on node-link structures. Processing circuitry 680 then uses the constrained node-link data to automatically obtain data defining an output image such as an image showing a precisely formed node-link structure or an edited image. This data is provided to printing circuitry 690 for printing of output image 692.

The invention could also be applied in combination with other techniques, including those described in coassigned U.S. Pat. No. 5,455,898, entitled "Analyzing an Image Showing a Graphical Representation of a Layout" and in coassigned, copending U.S. patent application Ser. No. 08/158,063 entitled "Using a Category to Analyze an Image Showing a Graphical Representation," both incorporated herein by reference.

E. Miscellaneous

The invention has been described in relation to implementations that analyze images showing human-produced sketches or editing marks. The invention might also be implemented to analyze other types of images, by using appropriate criteria to obtain data indicating likely nodes and likely links and to obtain data indicating subsets of the likely nodes and links that form a node-link structure.

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method comprising:

obtaining input image data defining an input image set that shows an input node-link structure; the input image set showing a set of nodes that satisfy a constraint on nodes and a set of links that satisfy a constraint on links; the input node-link structure satisfying a constraint on node-link structures;

using the input image data to obtain likely node-link data; the likely node-link data indicating a first set of parts of the input image set that satisfy the constraint on nodes and indicating a second set of parts of the input image set that satisfy the constraint on links; and using the likely node-link data to obtain constrained node-link data, the constrained node-link data indicating a subset of the first set of parts and indicating a subset of the second set of parts, the subsets of the first and second sets of parts satisfying the constraint on node-link structures.

2. The method of claim 1 in which the input image set includes only one image, the one image showing all nodes and links in the input node-link structure.

3. The method of claim 1 in which the input image set includes first and second images, the first image showing a first subset of the set of nodes, the second image showing a second subset of the set of nodes.

4. The method of claim 3 in which the first image shows graphical features, each graphical feature being one of the first subset of the set of nodes; the second image showing an overlay with editing marks that can be superimposed on the first image to obtain the input node-link structure, the editing marks including the set of links and the second subset of the set of nodes.

5. The method of claim 1 in which the input image set shows a sketch made by hand.

6. The method of claim 1 in which the input image set includes pixels; the constraint on nodes including a node criterion; the constraint on links including a link criterion; the act of using the input image data to obtain likely node-link data comprising:

obtaining likely node data; the likely node data defining a version of the input image set in which each pixel's value indicates whether the pixel is in a part of the input image set that meets the node criterion; and obtaining likely link data; the likely link data defining a version of the input image set in which each pixel's value indicates whether the pixel is in a part of the input image set that meets the link criterion.

7. The method of claim 6 in which the node criterion requires a connected component that encloses more pixels than are in the connected component.

8. The method of claim 6 in which the link criterion requires a connected component that encloses less pixels than are in the connected component.

9. The method of claim 6 in which the link criterion requires a connected component with a first end that meets a head criterion and a second end that meets a tail criterion.

10. The method of claim 1 in which the constraint on node-link structures includes a link nearness criterion and a node nearness criterion;

the act of using the likely node-link data comprising a sequence of iterations, each iteration using starting node data and starting link data to obtain ending node data and ending link data; the sequence beginning with a first iteration and ending with a last iteration; the first iteration's starting node data indicating the first set of parts of the input image set; the first iteration's starting link data indicating the second set of parts of the input image set; the starting node data of each iteration after the first iteration being the ending node data of the preceding iteration; the starting link data of each iteration after the first iteration being the ending link data of the preceding iteration; the last iteration's ending node data and ending link data together being the constrained node-link data; each iteration comprising:

using the iteration's starting node data and starting link data to obtain the iteration's ending node data; each iteration's ending node data indicating parts of the input image set that are indicated by the iteration's starting node data and that meet the link nearness criterion; and using the iteration's starting node data and starting link data to obtain the iteration's ending link data; each iteration's ending link data indicating parts of the input image set that are indicated by the iteration's starting link data and that meet a node nearness criterion.

11. The method of claim 10 in which the link nearness criterion requires a part of the input image set that is the nearest part of the input image set that meets the node criterion to an end of a part of the input image set that meets the link criterion.

12. The method of claim 10 in which the node nearness criterion requires a part of the input image set with a length that is greater than a distance from an end of the part of the input image set to a part of the input image set that meets the node criterion.

13. The method of claim 10 in which each iteration further comprises:

using the iteration's starting node data, starting link data, ending node data, and ending link data to obtain stability data indicating whether a change occurred during the iteration; the stability data of the last iteration indicating that no change occurred during the last iteration.

14. The method of claim 1 in which the act of using the likely node-link data to obtain constrained node-link data comprises obtaining a list of nodes.

15. The method of claim 14 in which the act of using the likely node-link data to obtain constrained node-link data further comprises obtaining a list of links; each link in the list of links being defined as an ordered pair of nodes that are in the list of nodes.

16. The method of claim 1, further comprising:

using the constrained node-link data to obtain output image data; the output image data defining an output image set that shows an output node-link structure similar to the input node-link structure.

17. The method of claim 1 in which the input node-link structure is a directed graph, an undirected graph, a tree, a flow chart, a circuit diagram, or a state-transition diagram.

18. A method of operating a machine that includes:

image input circuitry for obtaining data defining images as input; and a processor connected for receiving data defining images from the image input circuitry;

the method comprising:

operating the processor to receive input image data from the image input circuitry, the input image data defining an input image set that shows an input node-link structure; the input image set including an image showing a set of nodes that satisfy a constraint on nodes and a set of links that satisfy a constraint on links; the input node-link structure satisfying a constraint on node-link structures;

operating the processor to use the input image data to obtain likely node-link data; the likely node-link data indicating a first set of parts of the input image set that satisfy the constraint on nodes and indicating a second set of parts of the input image set that satisfy the constraint on links; and operating the processor to use the likely node-link data to obtain constrained node-link data, the constrained node-link data indicating a subset of the first set of parts and indicating a subset of the second set of parts, the subsets of the first and second sets of parts satisfying the constraint on node-link structures.

19. The method of claim 18 in which the machine is connected for providing control signals to a system; the method further comprising:

operating the processor to use the constrained node-link data to obtain a control signal; and providing the control signal to the system.

20. The method of claim 18 in which the machine further comprises image output circuitry for providing data defining images as output; the method further comprising:

operating the processor to use the constrained node-link data to obtain output image data defining an output image that includes an output node-link structure similar to the input node-link structure; and providing the output image data to the image output circuitry.

21. A machine comprising:

image input circuitry for obtaining data defining images as input;

memory for storing data; and a processor connected for receiving data defining images from the image input circuitry and connected for accessing data stored in the memory;

the data stored in the memory comprising instruction data indicating image processing instructions the processor can execute; the processor, in executing the image processing instructions:

receiving input image data from the image input circuitry, the input image data defining an input image set that shows an input node-link structure; the input image set including a image showing a set of nodes that satisfy a constraint on nodes and a set of links that satisfy a constraint on links; the input node-link structure satisfying a constraint on node-link structures;

using the input image data to obtain likely node-link data; the likely node-link data indicating a first set of parts of the input image set that satisfy the constraint on nodes and indicating a second set of parts of the input image set that satisfy the constraint on links; and using the likely node-link data to obtain constrained node-link data, the constrained node-link data indicating a subset of the first set of parts and indicating a subset of the second set of parts, the subsets of the first and second sets of parts satisfying the constraint on node-link structures.

22. The machine of claim 21 in which the input image circuitry is connected for receiving facsimile transmissions.

23. The machine of claim 21 in which the processor is further connected for providing control signals to a system; the processor further, in executing the image processing instructions:

using the constrained node-link data to obtain a control signal; and providing the control signal to the system.

24. The machine of claim 21 in which the machine further comprises image output circuitry for providing data defining images as output; the processor further, in executing the image processing instructions:

using the constrained node-link data to obtain output image data defining an output image set that includes an output node-link structure similar to the input node-link structure; and providing the output image data to the image output circuitry.

25. The machine of claim 24 in which the output image circuitry is connected for providing facsimile transmissions.

26. The machine of claim 21 in which the machine is an image processing server; the image processing server being connected to a network for receiving requests for image processing operations; the network including the image input circuitry; the instruction data further indicating request handling instructions the processor can execute; the processor, in executing the request handling instructions, determining whether to execute the image processing instructions.

27. The machine of claim 21 in which the machine is a fax server.

28. The machine of claim 21 in which the machine is a copier.

29. A method comprising:

obtaining input image data defining a set of images that shows an input node-link structure; the set of images showing a set of nodes that satisfy a constraint on nodes and a set of links that satisfy a constraint on links; the input node-link structure satisfying a constraint on node-link structures, the constraint on node-link structures including a link nearness criterion and a node nearness criterion;

using the input image data to obtain probable node-link data; the probable node-link data indicating a first set of parts of the set of images that satisfy the constraint on nodes and indicating a second set of parts of the set of images that satisfy the constraint on links; and using the probable node-link data to obtain constrained node-link data by performing a sequence of iterations, the constrained node-link data indicating a subset of the first set of parts and indicating a subset of the second set of parts, the subsets of the first and second sets of parts satisfying the constraint on node-link structures; each iteration of the sequence using starting node data and starting link data to obtain ending node data and ending link data; the sequence beginning with a first iteration and ending with a last iteration; the first iteration's starting node data indicating the first set of parts of the set of images;

the first iteration's starting link data indicating the second set of parts of the set of images; the starting node data of each iteration after the first iteration being the ending node data of the preceding iteration; the starting link data of each iteration after the first iteration being the ending link data of the preceding iteration; the last iteration's ending node data and ending link data together being the constrained node-link data; each iteration comprising:

using the iteration's starting node data and starting link data to obtain the iteration's ending node data; each iteration's ending node data indicating parts of the set of images that are indicated by the iteration's starting node data and that meet the link nearness criterion; and using the iteration's starting node data and starting link data to obtain the iteration's ending link data; each iteration's ending link data indicating parts of the set of images that are indicated by the iteration's starting link data and that meet a node nearness criterion.

30. A method comprising:

obtaining input image data defining a set of images that shows an input node-link structure; the set of images showing a set of nodes that satisfy a constraint on nodes and a set of links that satisfy a constraint on links; the input node-link structure satisfying a constraint on node-link structures;

using the input image data to obtain probable node-link data; the probable node-link data indicating a first set of parts of the set of images that satisfy the constraint on nodes and indicating a second set of parts of the set of images that satisfy the constraint on links;

using the probable node-link data to obtain constrained node-link data, the constrained node-link data indicating a subset of the first set of parts and indicating a subset of the second set of parts, the subsets of the first and second sets of parts satisfying the constraint on node-link structures; and using the constrained node-link data to obtain output image data; the output image data defining an output image set that shows an output node-link structure similar to the input node-link structure.

* * * * *